June 1, 1943.　　　A. L. HOLCOMB　　　2,320,434
ELECTRIC MOTOR CONTROL SYSTEMS
Filed March 13, 1940　　　9 Sheets-Sheet 1
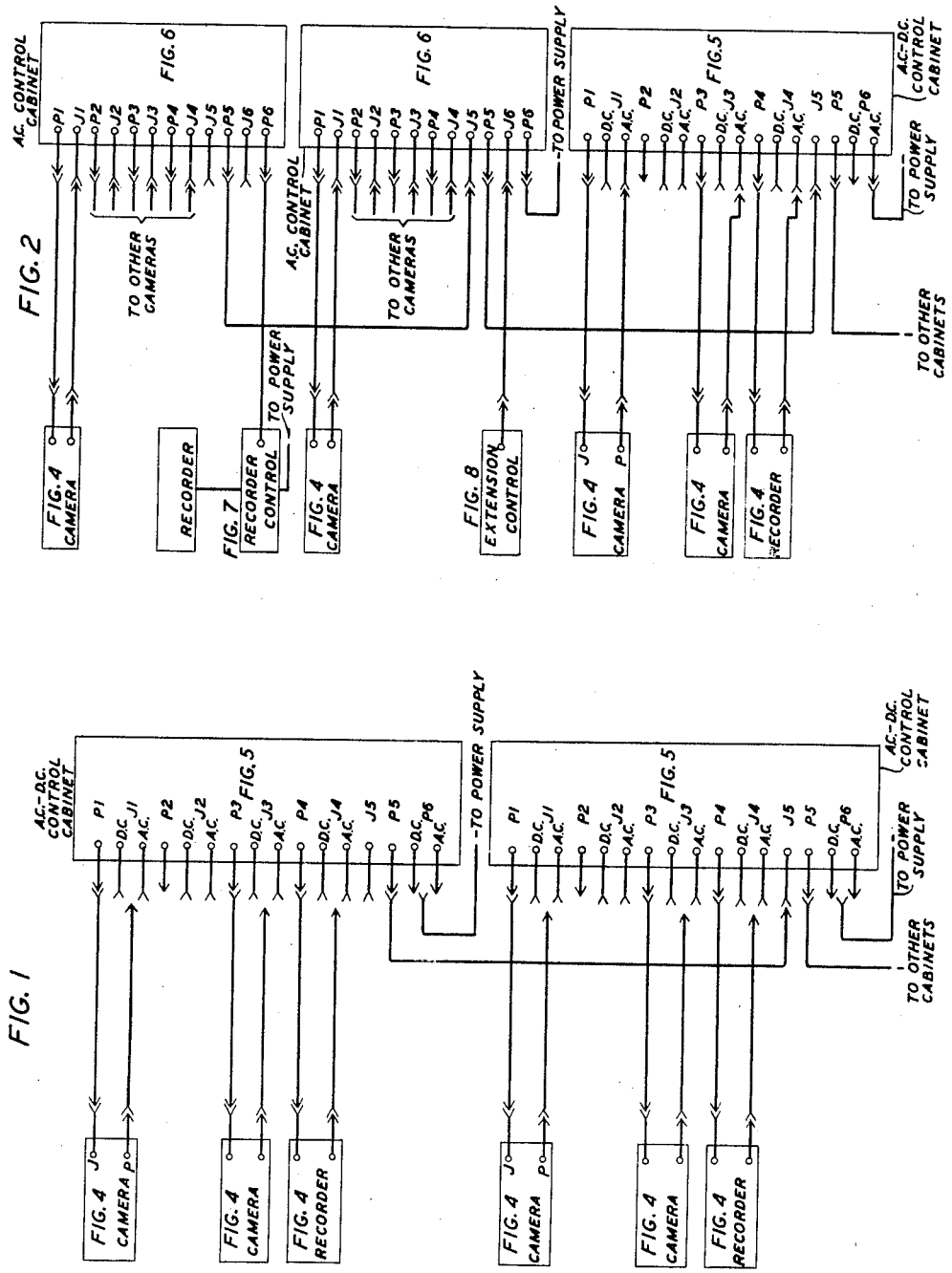
INVENTOR
A. L. HOLCOMB
BY
G. H. Heydt.
ATTORNEY

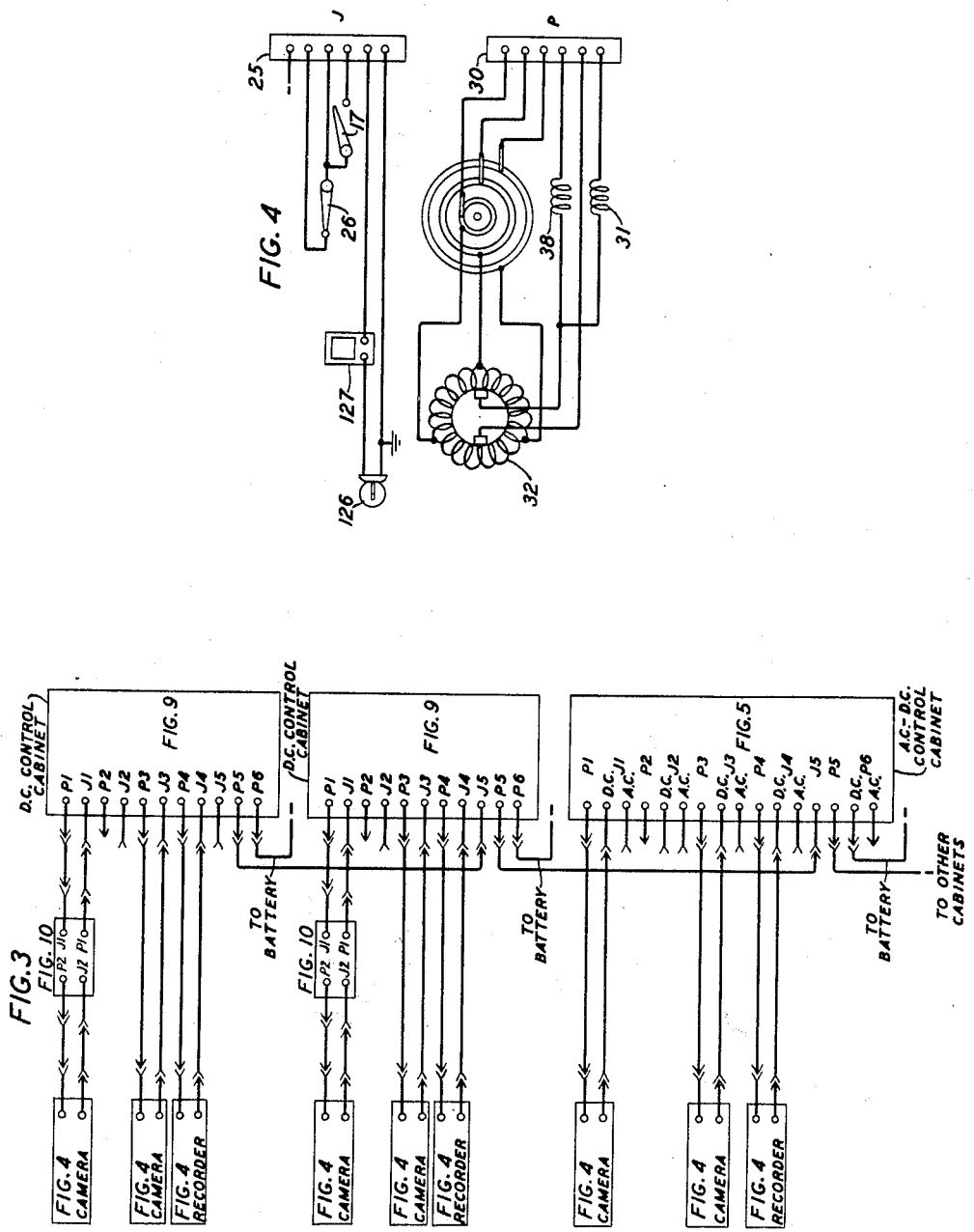

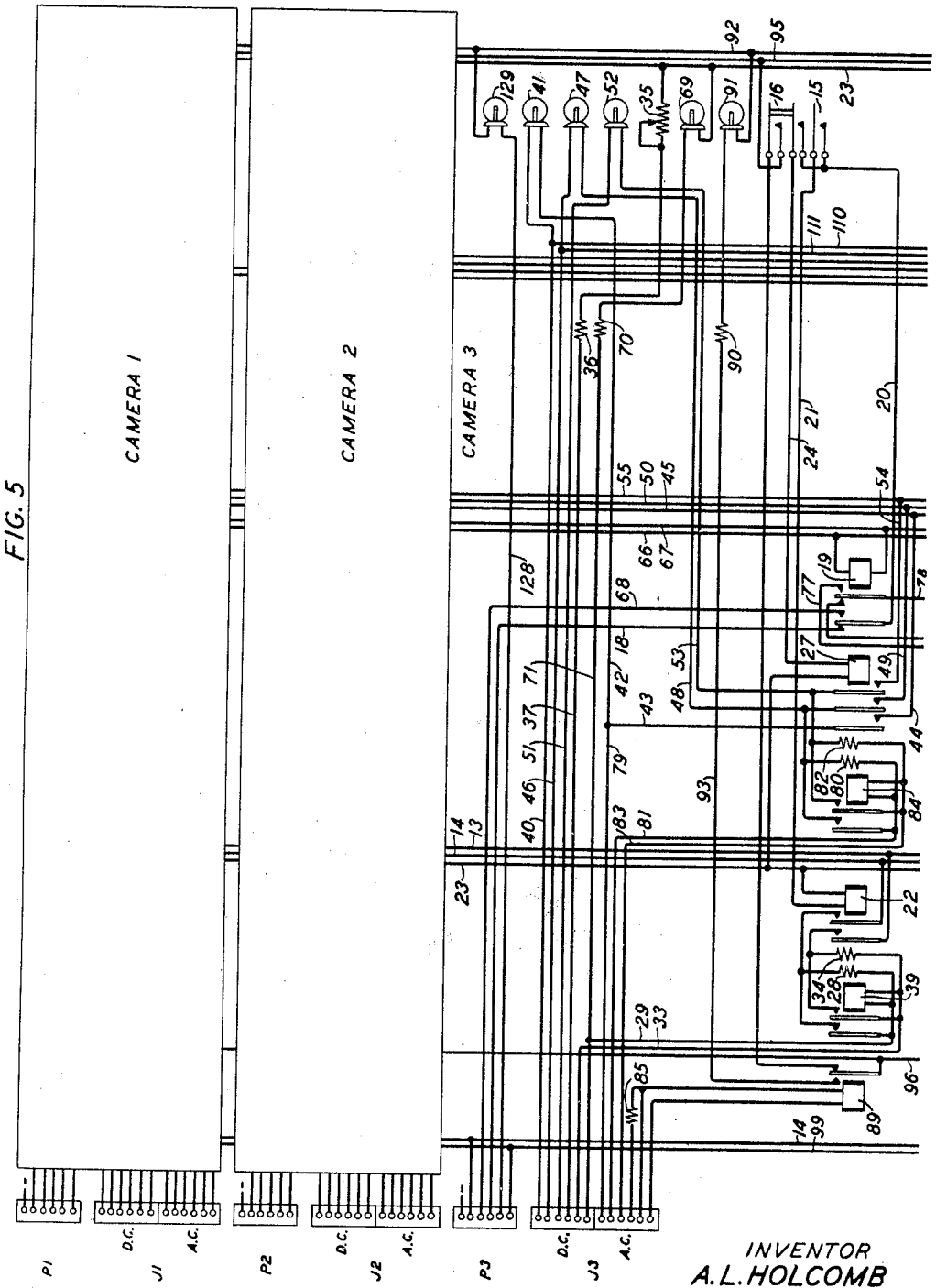

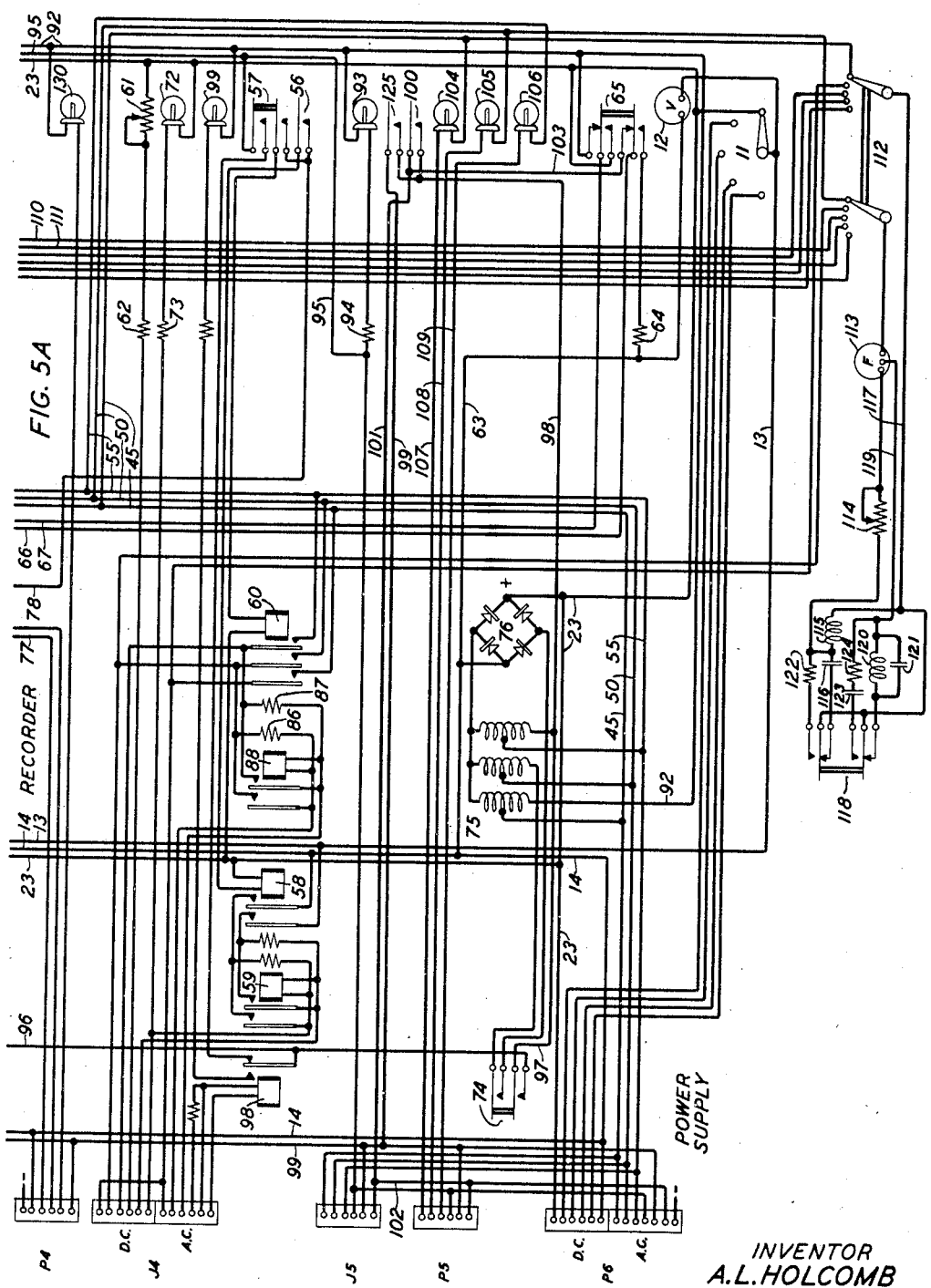

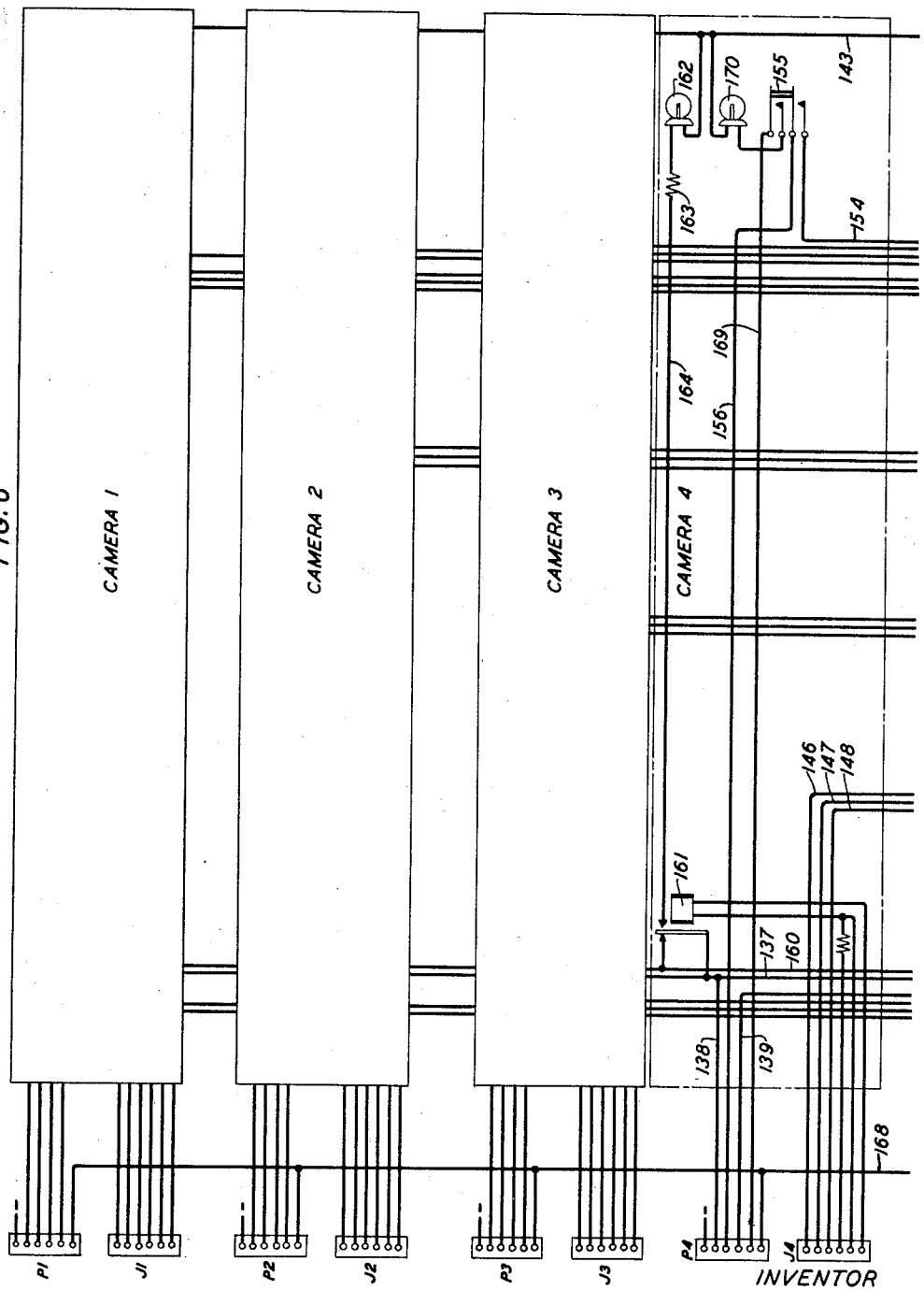

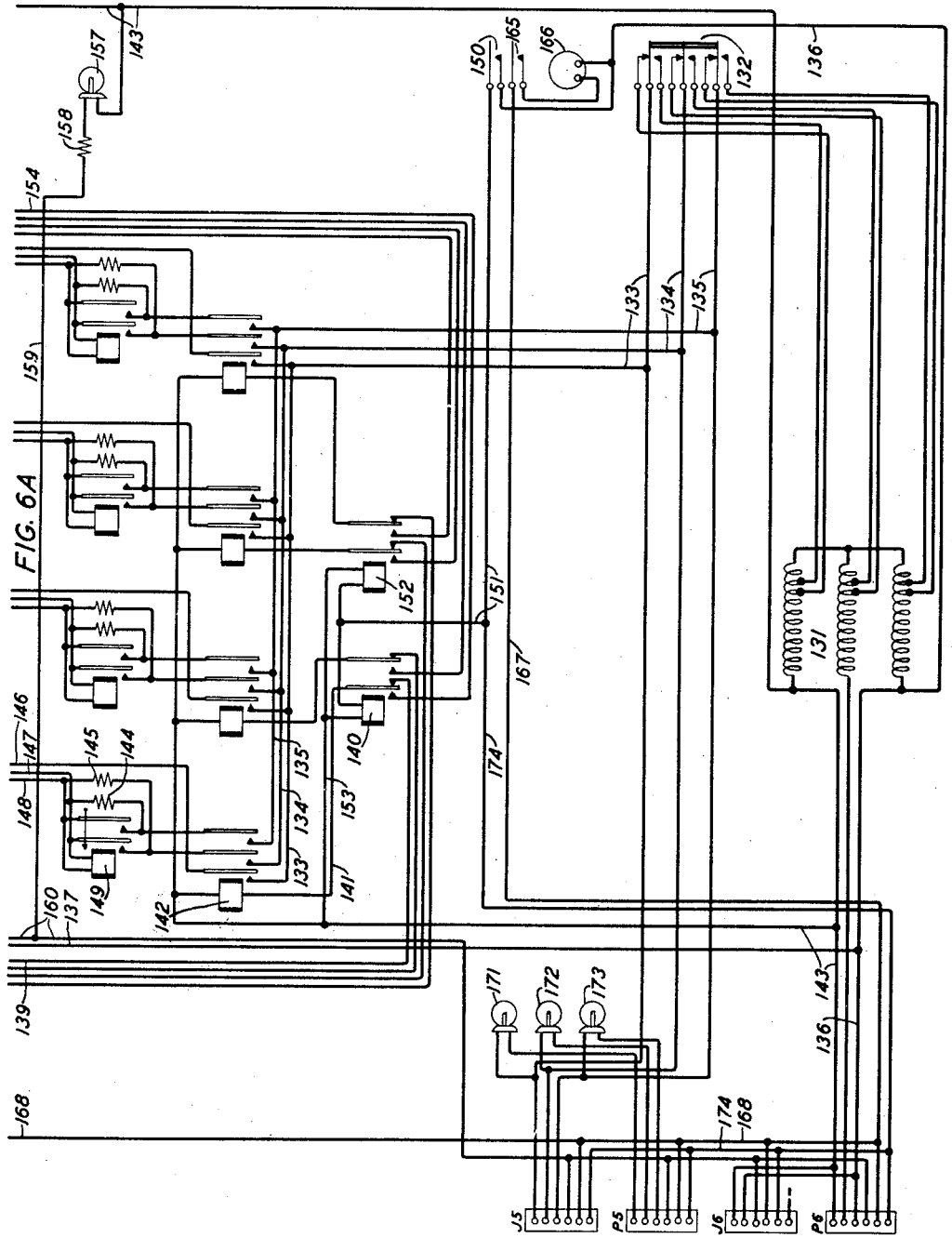

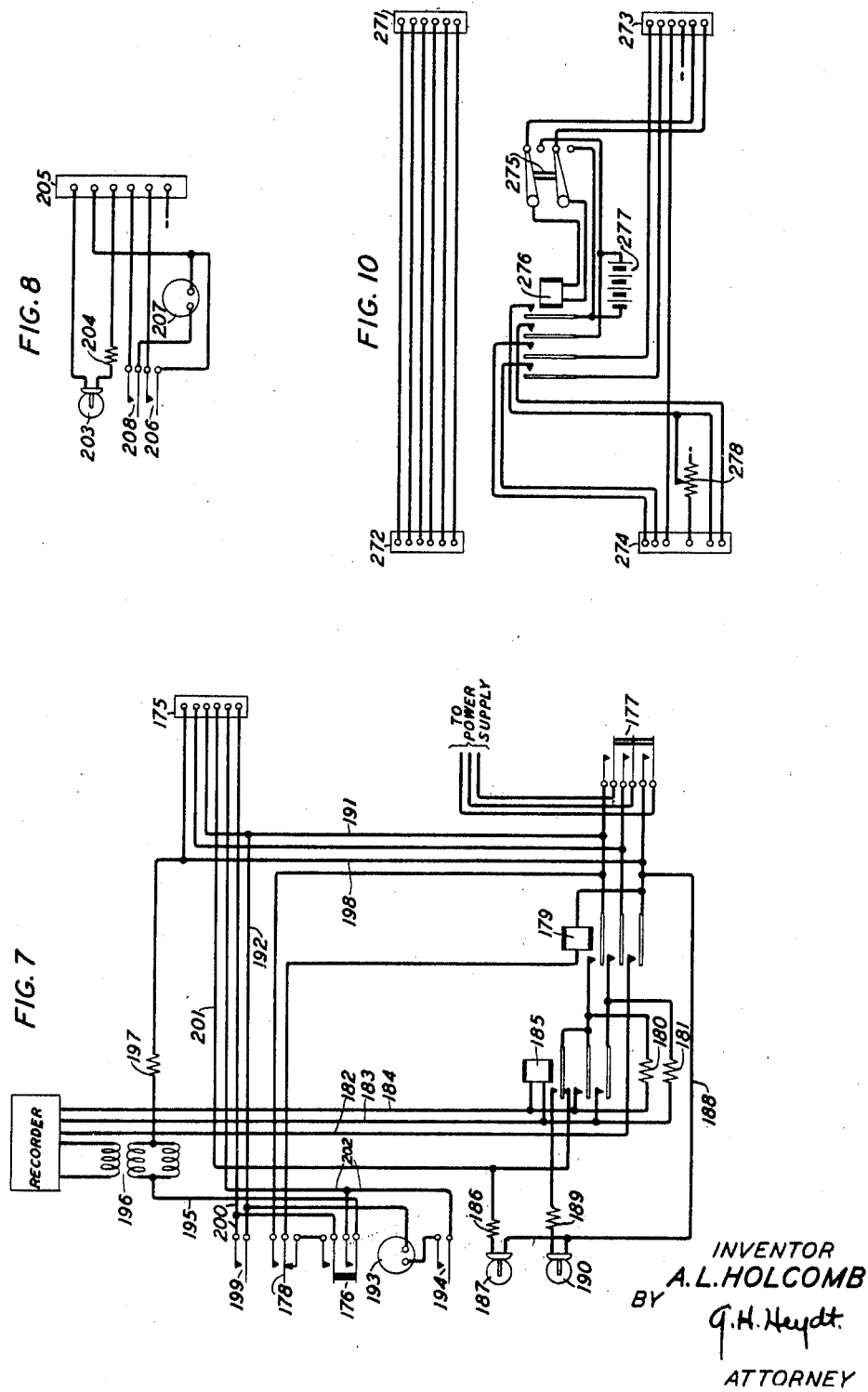

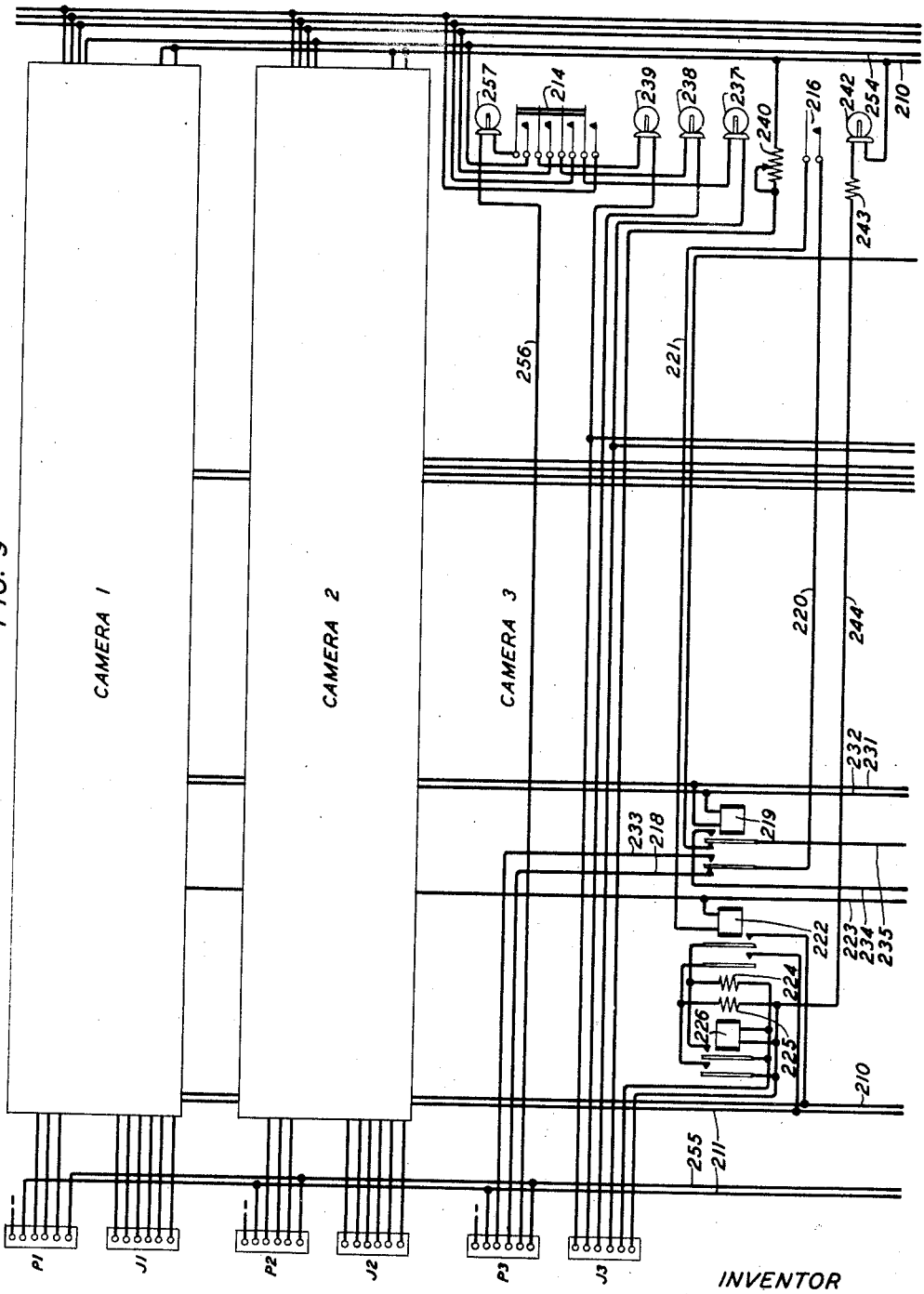

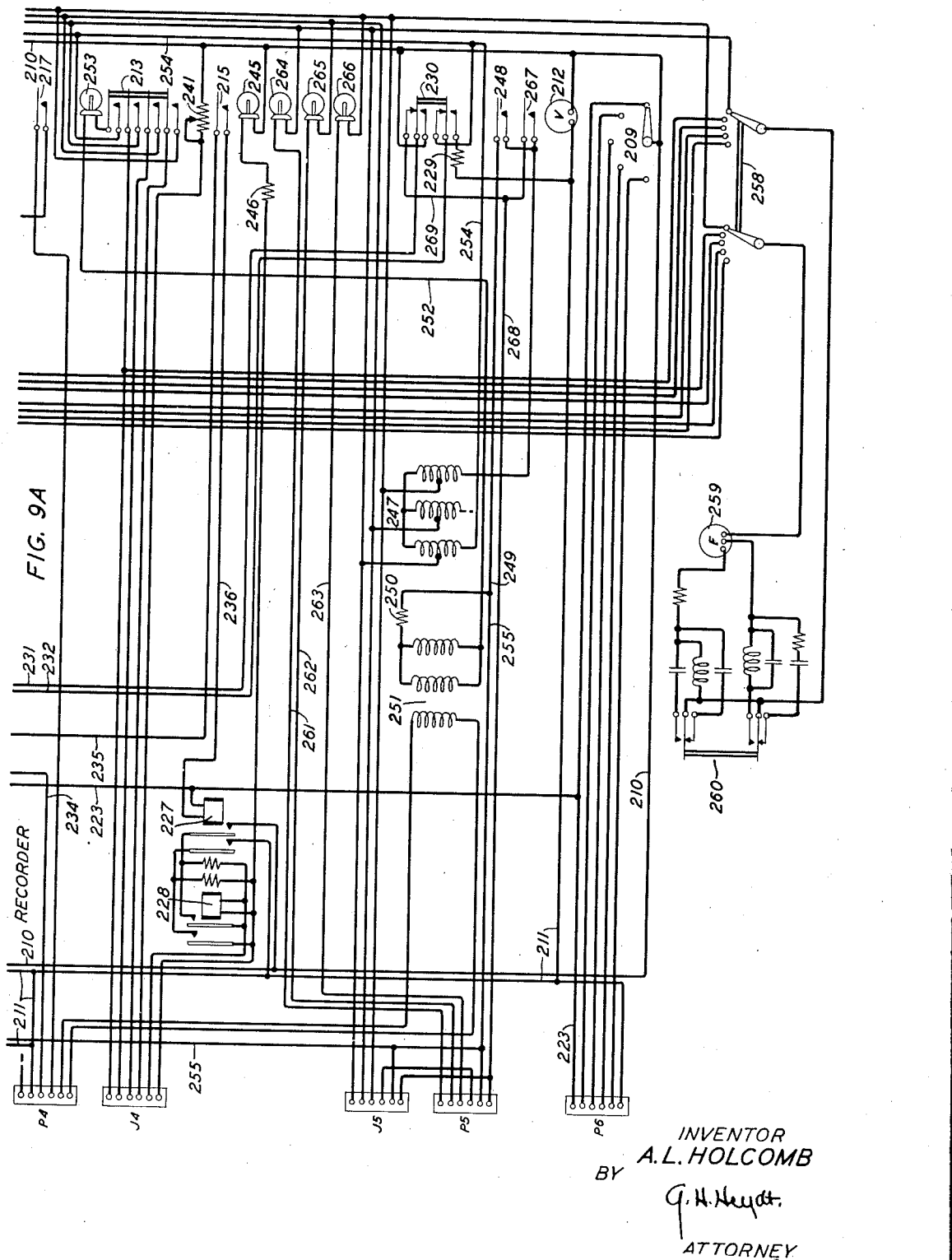

Patented June 1, 1943

2,320,434

UNITED STATES PATENT OFFICE 2,320,434

ELECTRIC MOTOR CONTROL SYSTEM

Arthur L. Holcomb, Tarzana, Calif., assignor to Western Electric Company, Incorporated, a corporation of New York Application March 13, 1940, Serial No. 323,674

19 Claims. (Cl. 88—16.2)

This invention relates to motion picture and sound recording systems and particularly to systems for controlling the motors and other apparatus used in such systems.

The object of the invention is a complete system of control adapted for various types of power supply and for the various conditions experienced in the motion picture studios and on location.

A feature of the invention is a cabinet for controlling a plurality of motion picture cameras and, if desired, one or more sound recorders. The control cabinet may be used individually or in combination with other cabinets.

Another feature of the invention is the provision of means for starting each motor individually at the camera, for starting one or all of the motors associated with a given cabinet at the cabinet and for starting any or all of the motors associated with all the cabinets in a system at any desired cabinet.

Another feature of the invention is the provision of means for "blooping" or simultaneously making a starting mark on the picture and the sound record of all the cameras and recorders associated with a cabinet or a plurality of cabinets. All the cameras and recorders in the whole system may be simultaneously "blooped" from any cabinet in the system. Preferably the marking agency will take the form of an alternating current supplied to a lamp or other device in the camera or sound recorder or an alternating current supplied to the recording device itself.

A further feature of the invention is the provision of running and synchronism indicators at each cabinet to show when the motors associated in the system are running at full speed and to indicate when a motor is out of synchronism.

Other features of the invention are an auxiliary cabinet for extending the control facilities of a cabinet to a distance, means for controlling a recorder permanently installed in the studio, and an auxiliary cabinet for controlling motors located at an abnormal distance from the power supply.

Still other features of the invention will be apparent from the following description and the drawings and the scope of the invention is not in any way limited to the features mentioned above, but only as set forth in the claims.

In the drawings,

Fig. 1 diagrammatically shows the invention embodied in a system operating on either alternating or direct current.

Fig. 2 diagrammatically shows the invention embodied in a system operating on alternating current.

Fig. 3 diagrammatically shows the invention embodied in a system operating on direct current.

Fig. 4 schematically shows the connections of a motor.

Figs. 5 and 5—A schematically show the wiring of an alternating and direct current control cabinet.

Figs. 6 and 6—A schematically show the wiring of an alternating current control cabinet.

Fig. 7 schematically shows the wiring of a cabinet for controlling a studio recorder.

Fig. 8 schematically shows the wiring of a cabinet for extending the control apparatus of an alternating current cabinet to a distance.

Figs. 9 and 9—A schematically show the wiring of a direct current control cabinet.

Fig. 10 schematically shows the wiring of an auxiliary cabinet for controlling a motor located at a distance from the control cabinet.

Following the introduction of sound recording synchronized with motion pictures, many studio practices and techniques were developed to efficiently utilize this new medium. After this decade of development, these practices have become better defined and the requirements of a control system for practicing these techniques may now be determined. Based upon information from a number of the largest studios outlining the facilities which the studios consider to be desirable, the present invention was conceived in order to provide these facilities in a cheap and convenient form.

All of the motors of the cameras filming a given scene must run in synchronism, thus an electrical interlock is provided between the camera motors. The motor of the sound recorder must run at a standard and very constant speed. When the motors of the picture cameras are running at normal speed, the motor of the sound recorder may be electrically interlocked with the motors of the cameras.

In the majority of the studios as a general rule, commercial three-phase alternating current is available. Thus the motors of the cameras and portable recorders in the present system are adapted to operate as synchronous motors on three-phase alternating current. However, in many cases, particularly on location, no alternating current power is available and the system must be operated on direct current. The motors of the present system are therefore adapted to operate also on direct current with a three-phase alternating current interlock circuit between the various motors.

The armatures are wound with a distributed winding, commonly found in direct current machines, connected to a commutator. The armature winding is also tapped at three electrically equidistant points which are led out through slip rings. The field has the usual direct current shunt and series windings, so arranged as to produce well defined salient poles. A short-circuited damper winding is also placed in recesses in the pole faces. When operating on direct current, the power is supplied in the usual manner to the commutator, and the field windings, and the tappings from the armature windings are interconnected with the similar tappings of the other motors. If any motor should drop out of synchronism with the other motors, a considerable interchange of current will take place between motors through the interconnected armature tappings. When operating on alternating current, three-phase alternating current is supplied to the tappings of the armature winding, and the current in the armature reacts with the damper winding to start the motor like an induction motor. The field windings, in this case, are excited by current from the commutator. At full speed the motor runs as a synchronous motor, but, due to the direct current excitation of the salient poles, the interlock to the supply line is more rigid than that obtained from the variable reluctance synchronous motors commonly used for this purpose. If a motor is running in synchronism with the supply line and drops out of synchronism, a reversal of polarity at the commutator brushes takes place each time the motor slips back a pole. This change in polarity reverses the polarity of the fields and this effect aids the armature to pull into synchronism when starting.

As indicated in Fig. 1 the switches and other control devices associated with each motor are wired to a jack and the motor itself is wired to a plug. These jacks and plugs may be in the form of receptacles mounted in a small cabinet attached to the machine or they may be attached to the end of suitable cords. Similarly, the corresponding jacks and plugs in the control box may preferably be in the form of receptacles mounted in the box or may be attached to suitable cords. If the jacks and plugs are in the form of receptacles mounted on the motors and in the control cabinets, then cords suitably terminated at each end in a jack or plug may be provided for interconnection. The plug of the control cabinet carrying the signal and control wires is plugged into the control jack of the corresponding motor and the power plug of the motor is plugged into the corresponding jack on the control cabinet. When the system is adapted for operation on either alternating current or direct current, two power jacks, one for alternating current and the other for direct current are provided in the control cabinet for each motor. The power plug of the motor is plugged into the jack corresponding to the type of power to be used and this type of power is also supplied to a corresponding power supply plug in the cabinet. A plug and jack is also provided in each control cabinet so that a plurality of cabinets may be interconnected and controlled from any one of the cabinets. As portable recorders are normally used in a system of this character, plugs and jacks are provided in the control cabinet to supply power to the motor of the sound recorder and to control the operation of the recorder.

The sytsem shown in Fig. 1 is adapted for operation on either alternating current or direct current. However, as a large proportion of the usual motion picture production is produced in large studios where commercial power is available, in such cases the control cabinet may be simplified by omitting the direct current facilities and providing facilities only for alternating current. Also, in many of the studios, the sound recorders are permanently installed in a suitable room and are directly supplied with alternating current for the motor of the sound recorder. In such cases, as shown in Fig. 2, the circuits of the control cabinet may be arranged to control the motor of an extra camera in place of a portable recorder and may be supplied with power from the recording room. The motor of the sound recorder may still be controlled at the control cabinet through the recorder control circuit and the motors of the cameras associated with the control cabinet may be controlled at the recorder through the recorder control circuit. An alternating current control cabinet of this type, supplied with power from the recorder room, may be associated with an alternating current control cabinet independently supplied with power. Either of these types of alternating current control cabinets may be associated with the dual alternating current, direct current cabinet shown in Fig. 1, when this dual cabinet is operating on alternating current. Any or all of the alternating current control cabinets may also be controlled from a distance through an extension control cabinet, which enables a supervisor on the motion picture set to control the starting of all the motors and the marking of all the films.

If a large amount of recording is to be done on location where alternating current power is not available, the dual alternating current, direct current cabinet shown in Fig. 1 may be simplified by the omission of the alternating current facilities to make a direct current control cabinet as shown in Fig. 3. A plurality of these direct current control cabinets may be associated together and they may be associated with one or more of the dual alternating current, direct current control cabinets when such cabinets are operated on direct current. As portable sound recorders are generally used on location, these may be supplied with power from the control cabinet. If a camera is located so far away from the control cabinet that the resistance of the leads to the motor causes unsteady operation of the motor, an extension box having a local supply of power may be provided for such motors.

As indicated on Fig. 1, the motor supply and control circuit shown on Fig. 4 is associated with the alternating current, direct current control cabinet shown in Figs. 5 and 5—A and these figures of the drawing should be considered together.

While the alternating current, direct current control cabinet shown in Figs. 5 and 5—A is arranged to control the motors of three cameras and one recorder, the circuit is not necessarily limited to such an arrangement and may easily be modified to control a large number of cameras or recorders or both. However, for the average motion picture scene, experience has shown that three cameras and one recorder are usually sufficient and if a more elaborate equipment should be required, it is usually preferable to use more than one control cabinet as shown in Fig. 1.

In Fig. 5 the control circuit for the motor of camera No. 3 is shown in full and the similar circuits for cameras Nos. 1 and 2 need not be shown as these circuits are essentially duplicates of the circuits shown for camera No. 3. A control plug and two power supply jacks, one for direct current and one for alternating current, are supplied for each of the motors of the three cameras and the motor of the recorder and are respectively numbered from 1 to 4. The jack and plug numbered 5 in Fig. 5—A are provided for interconnecting two cabinets. The two power supply plugs numbered 6 are respectively provided for the direct current and alternating current power supply.

A storage battery, or other convenient supply of direct current, may be connected to the upper or direct current part of the plug P6, Fig. 5—A. The positive terminal of the current supply is connected to the upper terminal of the plug P6 and the negative terminal of the power supply to the lower terminal of the plug P6. The power supply or battery may conveniently be tapped and intermediate potentials supplied to the intermediate terminals of the plug P6. In one typical embodiment of the invention a 96-volt battery was used and was tapped at 84, 72, 60 and 48 volts. The positive terminal of the power supply and the intermediate taps are connected from the terminals of the plug P6 direct to the contacts of the voltage control switch 11. A voltmeter 12 may be connected from the contact arm of the switch 11 to the negative battery lead 14 to indicate the voltage selected by the switch 11 and supplied to the motor. By this adjustment of the voltage supply, the motors of the cameras and recorder may be run at less than normal speed, if desired, for special effects. The contact arm of switch 11 is connected to a positive bus-bar 13 which is wired through the control circuit of all of the motors. The negative terminal of the power supply is connected through the lower terminal of the upper part of the plug P6 to the negative bus-bar 14 which is also wired through the control circuit of all the motors and is further connected up the left side of the drawings to the second terminal of the control plugs P1 to P4, respectively, associated with the camera and recorder motors.

Disconnect switches, such as the switches 15, 16, are provided for each motor so that any motor not in use may be disconnected from the cabinet. Normally the disconnect switches 15, 16 of all the motors in use are closed.

A circuit may be traced from the negative bus-bar 14 through the second terminal of plug P3, Fig. 5, to the second terminal of the jack 25, Fig. 4, through the film buckle switch 26 and the switch 17, when operated by the camera man, to the fourth terminal of the jack 25, thence to the fourth terminal of plug P3, Fig. 5, wire 18, left-hand break contact of relay 19, wire 20, contact of switch 15, wire 21, winding of relay 22, bus-bar 23, Figs. 5 and 5—A, to the upper or full voltage terminal of the upper section of plug P6, thence through the power supply or battery to the negative bus-bar 14. The film buckle switch 26, Fig. 4, is normally closed and is opened by the film in the camera only when the film buckles and becomes jammed in the mechanism. Thus when the camera man closes the switch 17 of Fig. 4, mounted on the camera motor, relay 22 will be operated. A circuit may also be traced from the negative bus-bar 14 through the camera switch 17, wire 18, contacts of relay 19, wire 20, contacts of switch 16, wire 24, winding of relay 27 to the positive bus-bar 23, thence through the battery. When the camera man closes switch 17 in Fig. 4, relay 27 will be operated over this circuit.

The operation of relay 22 closes a circuit from the negative bus-bar 14 through the right-hand make contact of relay 22, resistor 28, wire 29 to the lower terminal of the upper part of the jack J3 and thence to the lower terminal of plug 30, Fig. 4, through the series field 31 and armature 32 of the camera motor to the fifth terminal of plug 30, thence to the fifth terminal of the upper part of jack J3, wire 33, resistor 34, left-hand make contact of relay 22, bus-bar 13, contact arm of switch 11, Fig. 5—A, to a selected tap on the power supply and through the power supply back to the negative bus-bar 14. This circuit will supply power at a controlled voltage to the series field and armature of the motor. In Fig. 5—A the full voltage terminal of the power supply is connected to the upper terminal of the upper section of the plug P6, thence through wires 23 across the drawing to the right-hand contact of switch 11, thence upward to Fig. 5 through the field rheostat 35 and, if desired, the added resistor 36, wire 37 to the fourth terminal of the upper section of jack J3, thence to the fourth terminal of the plug 30, Fig. 4, through the motor shunt field 38 and the series field 31 to the lower terminal of the plug 30, thence to the lower terminal of the upper section of the jack J3, Fig. 5, wire 29, resistor 28, right-hand make contacts of relay 22, to the negative bus-bar 14, thus supplying current to the shunt field of the motor. The camera motor, Fig. 4, thus may be started when the switch 17 is closed.

In many studios, before a "take" is filmed, the take number, scene number, production and other information is written on a slate, the camera motor is started and the slate is photographed on the first few frames of the film. The switch 17 is provided so that each camera man may "slate" his camera as soon as he is ready to photograph the scene.

The resistors 28, 34, Fig. 5, reduce the voltage supplied to the motor at the start so that light loads will not be started too abruptly. Due to the heavy current drawn by the motor during starting and the consequent loss of voltage in the resistors 28 and 34, the relay 39 will not be operated. However, when the motor has attained sufficient speed, the back electromotive force generated by the armature will reduce the current flowing in the motor, thus reducing the voltage loss in the resistors 28 and 34 until sufficient voltage appears to operate relay 39 which will then short-circuit the resistors 28, 34 and connect the motors directly to the supply bus-bars.

In interlocked motors of this type, in addition to the usual connections between the armature winding and the commutator, the armature winding is also tapped at three electrically equidistant points. As shown in Fig. 4, these tappings are wired to the three upper terminals of the plug 30 and are connected through the cord to the three upper terminals of the upper section of the jack J3, Fig. 5. The upper terminal of the jack J3 connects through wire 40, lamp 41, wires 42 and 43, left-hand make spring of relay 27, wire 44, to the interlock bus-bar 45. The second terminal of the jack J3 connects through wire 46, lamp 47, wire 48, center make terminals of relay 27, wire 49, to the interlock bus-bar 50.

The third terminal of the jack J3 connects through wire 51, lamp 52, wire 53, right-hand make terminals of relay 27, wire 54, to the interlock bus-bar 55. As the motors of cameras 1 and 2 are wired similarly to the wiring of the motor of camera 3, the operation of the relays, such as relay 27, will connect the armature tappings of all the motors to the common interlock bus-bars 45, 50, 55 through the ballast lamps such as 41, 47 and 52.

The lamps 41, 47, 52 in the connection from each armature tapping to the interlock bus-bar, may be ordinary coil filament incandescent lamps of suitable carrying capacity. For slight differences in phase between a motor and the interlock bus-bar, the synchronizing currents are small, the resistances of the filaments of the lamps will be only a little greater than the cold resistance of the filament, thus the motors will quickly pull into synchronism without hunting. For large differences in phase between a motor and the synchronizing bus-bars, the synchronizing currents may become rather large and would tend to burn the motor commutators, but this large current causes the resistances of the filaments of the lamps 41, 47 and 52 to increase to a value approaching the hot resistance of the filament and this added resistance will limit the interlock current to a safe value. The lamps 41, 47, 52 will also indicate the phase relationship of the motor because when the field rheostats of the individual motors are properly adjusted to operate each motor at the same speed, little current is interchanged through the lamps and the filaments remain cold. If a motor is in step but tending to pull out, the lamps will show a steady glow which increases in brightness to the point at which the motor breaks out of synchronism, indicated by a bright flickering of the lamps.

The sound recorder is equipped with a motor which may be of the same general type as the camera motor and may have an individual starting switch connected as shown in Fig. 4. The control wires from the motor driving the sound recorder are connected to plug P4, Fig. 5—A and the power wires are connected to the upper section of jack J4. The control apparatus associated with the motor on the sound recorder is substantially the same as the control apparatus associated with the camera motor and operates in substantially the same manner. The disconnect switches 56, 57 correspond to the disconnect switches 15, 16, in Fig. 5, the start relay 58 corresponds to the start relay 22, the slow start relay 59 corresponds to the slow start relay 39, the interlock switching relay 60 corresponds to the interlock switching relay 27 and the field rheostat 61 and resistor 62 correspond to the field rheostat 35 and resistor 36. When the switch at the sound recorder motor is closed, this motor will start in substantially the same manner as described hereinabove in relation to the camera motor. As the sound recorder must run at a very steady and constant speed, the tappings from the armature winding are connected directly to the interlock bus-bar, the ballast lamps corresponding to 41, 47, 52 being omitted. The motor on the sound recorder will thus tend to run at a very constant speed and will also tend to make the camera motors synchronize with it.

In many cases, there is an advantage in being able to start all the motors associated with a certain production simultaneously from one control cabinet. A circuit may be traced from the negative battery bus-bar and the plug P6, Fig. 5—A, through wire 63, resistor 64, lower make spring of switch 65, wire 66, through the winding of relay 19, Fig. 5, wire 67, upper make springs of switch 65, Fig. 5—A, to the positive battery bus-bar 23. The operation of switch 65 will thus cause the operation of relay 19, Fig. 5. When relay 19 operates, a circuit is closed from negative battery bus-bar 14 through the second terminal of plug P3, Fig. 5, to the second terminal of jack 25, Fig. 4, through the film buckle switch 26 to the third terminal of jack 25, thence to the third terminal of the plug P3, Fig. 5, wire 68, to the left-hand make contact of relay 19, wire 20, switches 15 and 16, the windings of relays 22 and 27, to the positive battery bus-bar 23. A circuit may also be traced from the negative battery bus-bar 14 through the second terminal of the plug P4, Fig. 5—A, to the second terminal of the jack 25, Fig. 4, to the third terminal of jack 25 to the third terminal of plug P4, Fig. 5—A, wire 77, right-hand make contact of relay 19, Fig. 5, wire 78, switches 56 and 57, windings of relays 58 and 60 to the positive battery bus-bar 23. Thus by closing switch 65 and operating relay 19, the motors associated with camera No. 3 and the sound recorder will start, even though the individual switches at the motors are not operated. A relay, similar to relay 19, may be provided for the other two camera motors so that all the motors associated with the control cabinet may be started by the operation of the switch 65. If desired, separate switches may be provided to control the starting of each two motors.

A circuit may be traced from the positive battery bus-bar 23 on the right-hand side of Fig. 5 through lamp 69, resistor 70, wire 71, wire 29, resistor 28, right-hand make contact of relay 22, to the negative battery bus-bar 14. Thus, whenever relay 22 is operated to start the motor of camera No. 3, the lamp 69 is lighted and indicates at the cabinet that the motor is running. This indication is desirable when the motor has been started by the camera man for slating or other non-synchronous operation, as it permits the operator at the cabinet to adjust the field rheostat to give the correct motor speed as shown on the tachometer while the motor is running, thus avoiding starting the motor only for this purpose. A lamp of this character may be provided for each motor associated in the system, including the recorder motor.

When the system is to be operated on alternating current, three-phase alternating current from some convenient supply is connected to the upper three terminals of the lower section of plug P6, Fig. 5—A. In a typical embodiment of the invention, the motors were wound to operate on 96-volt direct current, thus the three-phase supply was about 65 volts so that the voltages in the interlock circuit would be about the same in both cases. In such a case, the power of the motor on alternating current, will be somewhat less than the power on direct current, but allowance for this difference may be made in the design of the motor. Normally the motors are made large enough to operate satisfactorily on alternating current and when operated on direct current, the motors have a slight surplus of power over the requirement.

The three-phase power supply is connected to the upper three terminals of the lower section of the plug P6, Figs. 5—A, and thus is connected directly to the interlock bus-bars 45, 50 and 55. When the power supply is plugged into the plug P6, the switch 74 is operated. The low voltage tappings of the three-phase autotransformer 75 are permanently connected to the three-phase bus-bars 45, 50 and 55. The upper make spring of switch 74 closes a circuit from the center autotransformer to the bridge-connected rectifying network 76. This rectifier network supplies current to the various control lamps, relays, etc., in place of the current which, when operating on direct current, is supplied by the power battery. When the system is operated on alternating current, the disconnect switches, such as 16 and 57, for all of the motors are closed, and the direct current disconnect switches, such as 15 and 56 are opened. A circuit may be traced from the left-hand, or negative, terminal of the rectifying network 76, wire 63, negative bus-bar 14, second terminal of plug P3, Fig. 5, second terminal of jack 25, Fig. 4, through switch 26 and switch 17 when operated by the camera man, fourth terminal of jack 25, Fig. 4, and of plug P3, Fig. 5, wire 18, left-hand break springs of relay 19, lower make springs of switch 16, wire 24, winding of relay 27, positive bus-bar 23, to the right-hand or positive terminal of the rectifying network 76. Thus, when the camera man closes switch 17, relay 27 will operate, connecting power from the three-phase bus-bars 45, 50, 55 through wires 44, 49, 54 to the springs of relay 27. The left-hand make spring of relay 27 connects wire 44 to wire 43, thence through wire 79 to the upper terminal of the lower section of jack J3. The center make spring of relay 27 connects wire 49 through resistor 80 and wire 81 to the second terminal of the lower section of jack J3. The right-hand make spring of relay 27 connects wire 54 through resistor 82 and wire 83 to the third terminal of the lower section of the jack J3. The upper three terminals of the lower section of jack J3, Fig. 5, are connected to the upper three terminals of plug 30, Fig. 4, and thence to the tappings on the armature windings of the camera motors. Thus when the switch 17 is closed by the camera man, operating relay 27, three-phase alternating current is applied to the motor and the motor starts. As soon as the motor attains sufficient speed, the back electromotive force generated in one phase of the armature winding reduces the voltage loss in the resistors 80 and 82, permitting relay 84 to operate and short-circuit the resistors 80 and 82. The resistors 80 and 82 and the relay 84 will thus operate to reduce the shock on starting, in a manner similar to the operation of the resistors 28 and 34 and relay 39 when operating on direct current. The voltage generated in the armature of the motor and appearing across the direct current commutator causes a current to flow through the shunt field 38 to the fourth terminal of plug 30, Fig. 4, thence to the fourth terminal of the lower section of jack J3, Fig. 5, through resistor 85, thence through the fifth terminal of the lower section of jack J3 and the fifth terminal of plug 30, Fig. 4, back to the armature. This circuit provides shunt field excitation for the motor.

In a similar manner, by closing the starting switch at the motor of the sound recorder, the relay 60, Fig. 5—A, operates, supplying three-phase current from the three-phase bus-bars to the recorder motor, one phase being supplied through the resistors 86, 87. When the motor associated with the sound recorder comes up to speed, relay 88 operates short-circuiting the resistors 86, 87. Also by closing switch 65 and thus operating relay 19, the motors of camera No. 3 and of the sound recorder will be started in a manner similar to the simultaneous starting of the motors on direct current.

The voltage generated in the armature of the motor and appearing across the commutator causes a current to flow through the series field 31 of the motor, Fig. 4, lower terminal of plug 30, lower terminal of the lower section of jack J3, Fig. 5, winding of relay 89, fifth terminal of the lower section of jack J3, fifth terminal of plug 30, Fig. 4, back to the commutator, thus operating relay 89. The operation of relay 89 closes a circuit from the high voltage and of the left-hand winding of the auto-transformer 75 through wire 92, lamp 91, resistor 90, make springs of relay 89, wire 96, make springs of switch 74, wire 97 to the high voltage end of the right-hand winding of the auto-transformer 75, thus lighting the lamp 91. The lighting of the lamp 91 and its steady burning indicates that the corresponding motor has come up to speed and is in synchronism with the other motors in the system.

If the motor should get out of synchronism with the other motors in the system, there will be a sudden reversal of polarity across the commutator which will cause the relay 89 to fall back. When the relay 89 falls back, the lamp 91 individual to the motor will be momentarily extinguished. A circuit is also closed from the high voltage end of the left-hand winding of the autotransformer 75 through wire 92, lamp 93, resistor 94, wire 95, upper make springs of switch 16, break contacts of relay 89, wire 96, lower make springs of switch 74, wire 97 to the high voltage end of the right-hand winding of the auto-transformer 75, thus momentarily lighting the lamp 93 and indicating that one of the motors has dropped out of synchronism. The simultaneous extinguishment of the lamp, such as lamp 91, corresponding to the motor, indicates which one of the motors has dropped out of synchronism. If the lamps 91 and 93 continue to light intermittently, it indicates that the particular motor is overloaded and is slow in coming up to speed.

As described hereinabove, the operation of relay 19 will start the motors of camera No. 3 and of the sound recorder. Relay 19 may also be operated by closing switch 100 thus forming a circuit from the high voltage end of the right-hand winding of the autotransformer 75, wire 98, through the springs of switch 100, wire 103, lower break springs of switch 65, wire 66, winding of relay 19, wire 67, upper break springs of switch 65, wire 92 to the high voltage end of the left-hand winding of the auto-transformer 75, thus operating the relay 19 across one phase of the auto-transformer 75.

All of the motors associated with a given control cabinet may be started simultaneously with all the motors associated with one or more control cabinets. As shown in Fig. 1, when two cabinets are associated to form a large system, the cabinets are interconnected by connecting the plug P5, Fig. 5—A, of one cabinet to the jack J5 of the other cabinet. As described above, the operation of switch 100 will start all the motors associated with a given cabinet. Let us assume that two cabinets are interconnected together and that switch 100 of the second cabinet has been closed thus starting all the motors associated with that cabinet. By closing switch 100 in the distant cabinet, power is supplied by the high voltage end of the right-hand winding of the auto-transformer 75 associated with that cabinet and flows along wires 98, switch 100, wire 101 to the lower terminal of the jack J5 which is interconnected with the plug P5 on the rear control cabinet so that the current flows from the lower terminal of plug P5, wire 102, 101, wire 103 through the lower break contact of switch 65, wire 66, winding of relay 19, wire 67, upper break contact of switch 65, wire 92 to the high voltage end of the left-hand winding of the auto-transformer 75 in the control cabinet. As the auto-transformers 75 in both of the cabinets are supplied with power from the same three-phase power supply, current will flow through this circuit and will operate relay 19 in the near control cabinet thus starting the motors of this control cabinet simultaneously with the starting of the motors in the distant cabinet. The motors of any number of cabinets may thus be started from any one of the cabinets.

As the motor driving the sound recorder is directly connected to the interlock bus-bar, if two cabinets were joined directly together, the motors of the two sound recorders would be directly interconnected through the interlock bus-bar and the synchronizing current might produce burning of the commutators. To prevent this effect, the interlock bus-bars 45, 50 and 55 are connected through the lamps 104, 105, 106 and wires 107, 108 and 109 to the three upper terminals of the interconnecting plugs P5, Fig. 5—A. Thus when two cabinets are interconnected the ballast lamps 104, 105 and 106 will be connected in the interlock circuit between the two cabinets.

It is very important that each take of a motion picture production should be made at a known speed so that the various takes will synchronize together in the final film. Taps, such as wires 110 and 111, are taken off one phase of the interlock circuit of each motor and wires to the contacts of switch 112. The right-hand contacts of the switch 112 are connected to one phase of the three-phase bus-bar so that, when operated on alternating current, the frequency of the alternating current supply may also be measured. The contact arm of the switch 112 is connected to the mid-point of a differentially wound frequency meter 113 associated with a plurality of frequency selective networks for determining the range of the frequencies to be measured.

In the position of the key 118, as shown, one winding of the meter 113 is connected through the adjusting variable resistor 114, through inductor 115 to wire 117, and through capacitor 116 and upper break springs of key 118 to wire 117. The inductor 115 and capacitor 116 are thus in parallel relationship and form a frequency selective resonant network. The other winding of the meter 113 is connected through wire 119 to the inductor 120 and capacitor 121 in parallel, lower break springs of key 118 to wire 117. The inductor 120 and capacitor 121 also form a resonant network. One network resonates at a frequency slightly above the normal frequency, the other network resonates at a frequency slightly below normal frequency, and the networks are adjusted so that at normal frequency, the currents in the two windings are equal and the meter is balanced, but at any other frequency the currents are unequal and the meter is deflected from a central position. When the motors are running at subnormal speed the range of meter 113 may be increased by operating key 118, thus connecting the inductor 115 in parallel with resistor 122 to one winding of the meter, and the capacitor 123 in series with resistor 124 to the other winding of the meter. The range of frequencies which may be measured in the second case is much wider than the range which may be measured with the two tuned circuits used in the first case.

When the motion picture record and the sound record are made on separate machines, the motion picture film and the sound record must be marked at the beginning of each "take" so that the picture record and the sound record may be synchronized for the production of the final combined record. These synchronizing marks are commonly known as "bloop" marks. The synchronizing circuit may be manually operated from any one of the control cabinets associated in the system. A circuit may be traced from the high potential end of the right-hand winding of the auto-transformer 75, wire 98, switch 125, wire 99, to the lowest terminal of the plug associated with any of the motors, such as plug P3, Fig. 5, thence to the lower terminal of jack 25, Fig. 4, through the lamp 126 and the buzzer 127 to the fifth terminal of jack 25, thence to the fifth terminal of plug P3, Fig. 5, wire 128 and lamp 129 and wire 92 to the high potential end of the left-hand winding of the auto-transformer 75, Fig. 5—A. Thus by closing the switch 125, the lamps in the cameras fog a short section of the picture film and the buzzer gives an audible signal to the artist that the system is ready for the "take." The alternating current from the auto-transformer 75 is derived from the power supply when the system is operated on alternating current and is derived from the interlock bus-bars when the system is operated on direct current. A pilot light, such as the lamp 129, is provided for each motor, the lamp for the recording motor being shown on Fig. 5—A as lamp 130. When the switch 125 is closed, the pilot light in the control cabinet glows dimly when the "blooping" circuit is normal, does not light at all when the "blooping" circuit is opened and glows brilliantly if the lamp in the camera is short-circuited. The "blooping" signal supplied through the lamp 130 to the sound recorder may operate a lamp which fogs the film in a manner similar to the fogging of the picture film or this current may be supplied through the recording circuit to the recording device so that the sound record will show a short section of an alternating current record of constant amplitude. When two or more cabinets are interconnected, closing switch 125 completes a circuit from the high voltage end of the right-hand winding of auto-transformer 75, wire 98, switch 125, wire 99 to fifth terminal of jack J5, thence to fifth terminal of plug P5 in all the other cabinets, and in those cabinets from fifth terminal of plug P5, wire 99, lower terminal of the motor plugs, such as P3, through the "blooping" lamp and buzzer at the camera, fifth terminal of P5, wire 128, lamp 129, wire 92 to the high voltage end of the left-hand winding of the auto-transformers 75 in the other cabinets, thus "blooping" the cameras and sound recorders associated with the other cabinets.

When the recording system is to be used only in the studios, as shown in Fig. 2, the control cabinet may be simplified by the omission of the direct current control features. An alternating current control cabinet of this type is shown in Figs. 6 and 6—A. Three-phase alternating current from the studio power supply is connected to the upper three terminals of the plug P6, Fig. 6—A. The alternating current supply in the studio will normally be at one of the common commercial voltages, in many cases 220 volts. This 220-volt supply is connected to the three-phase autotransformer 131 where the voltage is stepped down to 61 or 65 volts and connected from the autotransformer 131 to the three-phase voltage selecting switch 132. The low voltage alternating current is supplied to the alternating current busbars 133, 134, and 135. A circuit may be traced from the incoming alternating current supply bus-bar 136, wires 137 and 138 to the second terminal of the plug P4, Fig. 6, thence to the second terminal of jack 25, Fig. 4, through the film buckle switch 26 and the switch 17 when closed by the camera man to the fourth terminal of jack 25 thence to the fourth terminal of plug P4, Fig. 6, wire 139, left-hand break contact of relay 140, wire 141, winding of relay 142, wire 143, back to the studio alternating current power supply, thus operating relay 142 when the switch 17 is operated. The operation of relay 142 closes a circuit from the low voltage alternating current bus-bars 133, 134 and 135 through the make contacts of relay 142, thence through the resistors 144 and 145 to the three-phase leads 146, 147 and 148 connected to the three upper terminals of the jack J4, Fig. 6, which are connected to the upper three terminals of plug 30, Fig. 4, thence to the winding of the camera motor. Thus by closing the switch 17, Fig. 4, the camera man may individually start the motor of one camera. As soon as the motor has attained sufficient speed, the generated electromotive force will operate the relay 149 thus short-circuiting the resistors 144 and 145.

In order to start all of the motors associated with the control cabinet from the control cabinet, switch 150 is operated closing a circuit from the studio power supply bus-bar 136 through the upper make contact of switch 150, wire 151, windings of relays 149 and 152 in parallel, wire 153, to the studio power supply bus-bar 143, thus operating relays 140 and 152.

When the motors are to be controlled from the control cabinet, the disconnect switches, such as 155, for each motor associated with the cabinet are closed. The operation of relay 140 closes a circuit from the studio power supply bus-bar 143 through the winding of the start relay 142, wire 141, left-hand make contact of relay 140, wire 154, lower make contact of disconnect switch 155, wire 156, to the third terminal of plug P4, Fig. 6, thence to the third terminal of jack 25, Fig. 4, through the film buckle switch 26 to the second terminal of jack 25, Fig. 4, thence to the second terminal of plug 4, Fig. 6, wire 138, wire 137, to the studio power supply, thus operating the relay 142 and starting the motor of the camera.

A circuit may be traced from the studio power supply bus-bar 143 through lamp 157 and resistor 158, wires 159 and 160, through the break contact of relay 161, wire 137 to the studio power supply, lighting lamp 157.

The winding of the relay 161 is connected to the lower two terminals of the jack 4, Fig. 6, thence to the lower two terminals of plug 30, Fig. 4, connecting the relay 161 across the armature and series field of the motor. As the motor comes up to speed, the electromotive force generated in the armature will eventually become large enough to operate the relay 161. The operation of relay 161 closes a circuit from the studio power supply bus-bar 143, through lamp 162, resistor 163, wire 164, make contact of relay 161, to the studio power supply bus-bar 137, thus lighting the lamp 162 individual to this particular motor. Thus, as each motor associated with the cabinet comes up to normal speed, a lamp, such as lamp 162, lights indicating to the operator of the cabinet that that particular motor has come up to speed. As soon as all of the motors associated with a particular cabinet have attained normal speed, thus operating all of the relays similar to relay 161, the lamp 157 will be extinguished.

If any of the motors should get out of synchronism with the supply line, there will be a sudden reversal of polarity across the armature and series field of that motor, thus releasing the relay 161, associated with the motor, momentarily extinguishing the lamp 162 associated with the motor, and lighting the lamp 157, common to all the motors. As soon as the armature of the motor has slipped back, an angle equivalent to one polepiece, the motor will again be in synchronism with the other motors, the relay 161 will operate extinguishing the lamp 157 and lighting the lamp 162. If, however, any particular motor is overloaded, or otherwise defective, so that it cannot attain synchronism with the other motors, the alternate flashing of the lamps 157 and 162 warns the operator of the control cabinet that the particular motor indicated is unable to attain synchronism with the other motors. The operator can then take such steps as are necessary to clear the trouble.

A start relay 142, a slow-start relay 149, and a synchronism indicating relay 161 are provided for each motor associated with the control cabinet, while a switching relay 140 is provided for each two motors associated with the cabinet. In the studios, the sound recording machines may be permanently installed in a recording room, thus the control cabinet is adapted to control four cameras only. If portable recorders are also used in the system, the cabinet shown in Fig. 5 may be used.

After all of the motors have been started and brought up to speed in proper synchronism, the switch 165 is operated, closing a circuit from the studio power supply bus-bar 136 through meter 166, switch 165, wire 167 to the "blooping" bus-bar 168 which connects to the lowest terminal of the plug, such as plug P4, Fig. 6, associated with each camera. The circuit extends from the lowest terminal of plug P4, Fig. 6, to the lowest terminal of jack 25, Fig. 4, thence through the "bloop" light 126 and buzzer 127 to the fifth terminal of jack 25, Fig. 4, thence to the fifth terminal of plug P4, Fig. 6, wire 169, upper make contact of the disconnect switch 155, lamp 170, to the studio power supply bus-bar 143, thus "blooping" each camera by exposing a short length of the film in the camera, and also giving an audible signal to the personnel on the set that the camera is now in condition to film the action. This circuit also lights an individual lamp 170 for each motor at the control cabinet, and gives an indication on the meter 166, common to all the cameras associated with a given cabinet. If the lamp 170 fails to light, it indicates that the circuit to that particular camera is open; if the lamp 170 only gives a dim light, it indicates that the circuit to that particular camera is functioning properly; and if the lamp 170 lights with unusual brilliancy, it indicates that the circuit to that particular camera has become short-circuited at some point. Thus the operator at the control cabinet can check whether all of the cameras have been successfully "blooped."

Two or more cabinets of this type may be interconnected together and the combined system may be controlled from any one of the cabinets. To interconnect two cabinets of this type, the jack J5, Fig. 6—A, of one of the cabinets is connected to the plug P5 of the other cabinet. Synchronizing current can then circulate from the three-phase bus-bars 133, 134, 135 of the first cabinet through the upper three terminals of the jack J5, to the upper three terminals of the plug P5 of the second cabinet, thence through the ballast lamps 171, 172, 173 in the second cabinet to the three-phase bus-bars 133, 134, 135 in the second cabinet. When the motors of the two cabinets are in synchronism or approximately so, the synchronizing currents are small, the resistance of the lamps 171, 172, 173 is practically the cold resistance of the lamp and therefore comparatively small so that the resistance inserted between the two groups of motors is small. However, if one group of motors is out of synchronism with the other group, comparatively large synchronizing current tends to flow between the two groups of motors, but this current flowing in the lamps 171, 172, 173 will increase the resistance of the lamps to a value approaching the hot resistance of the filament and this increase in resistance will limit the synchronizing current to a value which will not adversely affect the motors associated with either cabinet.

To start the motors associated with all of the cabinets interconnected to form a system, the switch 150 in one of the cabinets is closed. This completes a circuit from the studio power supply bus-bar 136 through switch 150, wire 151, wire 174 to the lowest terminal of the jack J5, thence to the lowest terminal of the plug P5, or jack J5, of the other cabinets and thence through the wire 174, wire 151, relays 140 and 152 in parallel, wire 153, wire 143, to the studio power supply bus-bar 143 in the other cabinets, thus operating the switching relays 140 and 152 and starting the motors of the different cabinets.

When two cabinets are interconnected, a circuit may be traced from the studio power supply bus-bar 143 in one of the cabinets through the lamp 157, resistor 158, wire 159, wire 160 to the fourth terminal of jack J5, thence to the fourth terminal of plug P5, or jack J5, in the other cabinet, thence over wire 160, break contact of relay 161 to the studio power supply bus-bar 137, thus lighting the lamp 157 in all of the cabinets. As each motor associated in the system comes up to speed, the corresponding relay 161 operates. When all of the relays 161 associated with all of the motors in the system have operated, the lamp 157 in all of the cabinets will be extinguished. Thus an operator at any one of the cabinets can tell when all of the motors associated in the system have come up to speed. If any of the motors associated in the system should drop out of synchronism, the corresponding relay 161 will be released lighting all of the lamps 157 in the various cabinets and extinguishing the running lamp 162 individual to that particular motor. A continued flashing of the lamp 157 thus indicates that some one, or more, of the motors have not attained synchronism.

After all of the motors associated in the system are running in synchronism at normal speed, the switch 165 in any one of the cabinets may be closed. This completes a circuit from the studio power supply bus-bar 136 through the meter 166, and switch 165, wire 167, wire 168 to the fifth terminal of jack J5, thence to the fifth terminal of plug P5, or jack J5, in the other cabinet, thence in those cabinets over wire 168 to the sixth terminal of the plug P4, thence to the jack 25, Fig. 4, through the "bloop" light and buzzer associated with that camera to the fifth terminal of jack 25, thence in that cabinet from the fifth terminal of plug P4, wire 169, upper make contact of disconnect switch 155, lamp 170 to the studio power supply bus-bar 143, thus "blooping" all of the cameras associated with all of the other cabinets, and lighting the "blooping" lamps associated with those cameras in the distant cabinet and indicating on the meter 166 of the controlling cabinet that the other cabinets have been successfully "blooped."

The alternating current control cabinet shown in Figs. 6 and 6—A may be associated with the alternating current, direct current cabinet shown in Figs. 5 and 5—A, when the latter is operated on alternating current. In this case the jack J5, Fig. 6—A, is interconnected with the plug P5, Fig. 5—A. As the starting, synchronizing and "blooping" of this combination is substantially the same as the starting, synchronizing and "blooping" of two cabinets of the type shown in Figs. 6 and 6—A, a detailed description of the interconnection between the alternating current cabinet and the alternating current, direct current cabinet is believed to be unnecessary.

The alternating current control cabinet shown in Figs. 6 and 6—A, may be associated with a sound recording control cabinet shown in Fig. 7. The plug P6, Fig. 6A, is connected to the jack 175 in Fig. 7, the disconnect switch 176 is closed and the power supply switch 177 is also closed. For "slating" or individually starting the recorder motor at the recorder, the switch 178 is operated, thus closing a circuit from one of the power supply bus-bars through the upper make contact of the switch 178 and the starting relay 179 to another of the power supply bus-bars, thus operating relay 179. The operation of relay 179 connects the power supply bus-bars through the resistors 180 and 181 to the wires 182, 183, 184, leading to the recorder motor and starts the recorder motor. As soon as the recorder motor has attained sufficient speed, the generated electromotive force operates the relay 185, short-circuiting the resistors 180 and 181. The operation of relay 179 completes a circuit from the upper power supply bus-bar through the break springs of relay 185, resistor 186, lamp 187 and wire 188 to the lower bus-bar of the power supply, thus lighting the lamp 187. The operation of relay 185 connects the upper bus-bar of the power supply through the make springs of relay 185, resistor 189, lamp 190 to wire 188 running to the lower bus-bar of the power supply, thus lighting the lamp 190 and extinguishing the lamp 187.

After the recorder motor has come up to speed, as shown by the lighting of the lamp 190 and the extinguishment of the lamp 187, the switch 194 is closed completing a circuit from the upper power supply bus-bar through wires 191 and 192, through the meter 193, switch 194, to the lower make contacts of switch 176, wire 195, through the primary winding of the transformer 196, resistor 197 and wire 198 to the lower power supply bus-bar, thus applying alternating current to the primary winding of the transformer 196. The secondary winding of the transformer 196 may be connected to the sound recording circuit leading to the sound recording device, so that the operation of the switch 194 will cause the sound recording device to produce a short length of record of the constant frequency, constant amplitude current supply from the power bus-bar, or this winding may be connected to a small lamp so placed in the recorder that it will expose a short length of the sound record, or the current from this transformer may operate any other electrical device that will make a distinctive mark upon the sound record. The operation of key 194 thus "bloops" or makes a starting mark on the sound record.

With the switch 178 in the unoperated position, the motor may also be started by the operation of switch 199 which completes a circuit from the upper bus-bar of the power supply through wires 191 and 192 through switch 199, upper make contact of switch 176, lower make contact of switch 178, through the winding of the starting relay 179 to the lower bus-bar of the power supply, thus operating the relay 179 and starting the motor.

When the recorder control cabinet shown in Fig. 7 is interconnected with one or more of the alternating current control cabinets shown in Figs. 6 and 6—A, power is supplied through switch 177 to the three upper terminals of jack 175, thence to the bus-bars in the other control cabinets. The operation of switch 199, Fig. 7 completes a circuit from the upper power supply bus-bar through wires 191, 192, switch 199, wire 200, to the lowest terminal of jack 175, thence to the lowest terminal of plug P6, Fig. 6—A, wire 174, windings of relays 140 and 154, wires 153 and 143, to the top terminal of plug P6, thence to jack 175, Fig. 7, wire 198 to the lowest bus-bar of the power supply, thus operating relays 140 and 152, Fig. 6—A, and starting the motors of the cameras. A circuit may also be traced through the upper power supply bus-bar, Fig. 7, wire 191, to the third terminal of jack 175, thence to the third terminal of plug P6, Fig. 6—A, wire 136, make springs of switch 150, when operated, wires 151 and 174, lower terminals of plug P6 and of jack 175, Fig. 7, wire 200, upper make springs of switch 176, lower break springs of switch 178, winding of relay 179 to the lower power supply bus-bar. Thus the operation of switch 150 in the alternating current control cabinet Fig. 6—A, will start the motor associated with the sound recorder. Thus when one or more of the recorder control circuits are associated with one or more of the alternating control cabinets, each of the motors in the system may be individually "slated" or started at the motor and all of the motors associated in the system may be started from any one of the cabinets or from any of the recorder control circuits.

When the start relay 179, Fig. 7, operates, it completes a circuit from the upper power supply bus-bar through the upper make springs of relay 179, the break springs of relay 185, wire 201, to the fourth terminal of jack 175, thence to the fourth terminal of plug P6, Fig. 6—A, wire 160, wire 159, resistor 158, lamp 157, wire 143, to the upper terminal of plug P6, thence to the upper terminal of jack 175, Fig. 7, wire 198 to the lower bus-bar of the power supply, thus lighting the lamp 157, Fig. 6—A, and holding the lamp lighted until the relay 185 has operated. A circuit may also be traced from the lower power supply bus-bar, Fig. 7, wire 188, lamp 187, resistor 186, wire 201 to the fourth terminal of jack 175, thence to the fourth terminal of plug P6, Fig. 6—A, wire 160, contacts of relay 161, wire 137, to the third contacts of plug P6, thence to the third contact of jack 175, Fig. 7, wire 191 to the upper power supply bus-bar, thus lighting the lamp 187. In other words, when any motor in the system is started, the lamps 187, Fig. 7 and 157, Fig. 6—A, are lighted and remain lighted until all of the motor associated in the system have been started and have come up to normal speed. Also, if any motor should drop out of synchronism thus releasing the corresponding relay 185, Fig. 7, or relay 161, Fig. 6, the lamps 157, Fig. 6, and 187, Fig. 7 will both light, showing that some motor in the system is not properly synchronized.

When the sound recorder is "blooped" by the operation of switch 194, a circuit is closed from the upper power supply bus-bar, wires 191 and 192, meter 193, switch 194, wire 202, to the fifth terminal of jack 175, thence to the fifth terminal of plug P5, Fig. 6—A, to the "blooping" bus-bar 168, thence through terminal 6 of any of the camera plugs to terminal 6 of jack 25, Fig. 4, through the "blooping" light 126 and buzzer 127 to the fifth terminal of jack 25, thence to the fifth terminal of the camera plug, Fig. 6, wire 169, upper make contact of the disconnect switch 155, lamp 170, wire 143, upper terminal of plug P6, upper terminal of jack 175, Fig. 7, wire 198, to the lower power supply bus-bar, thus "blooping" all of the cameras when the switch 194 is operated to "bloop" the recorder. A circuit may also be traced from the upper power supply bus-bar, Fig. 7, third contact of jack 175, to third contact of plug P6, Fig. 6—A, wire 136, meter 166, switch 165, wire 167, fifth terminal of plug P6, and of jack 175, Fig. 7, wire 202, lower make springs of switch 176, wire 195, primary winding of transformer 196, resistor 197, wire 198, to the lower power supply bus-bar. Thus the operation of switch 165, Fig. 6—A, will "bloop" all of the cameras and will also "bloop" all of the recorders.

In some cases an official, such as the director or his assistant, may desire to control the operation of the system from some vantage point on or near the set. An extension control box as shown in Fig. 8 may be provided for this purpose. In Fig. 6—A, a circuit may be traced from the upper terminal of jack J6, wire 143, lamp 157, resistor 158, wires 159 and 160, to the third terminal of jack J6. The plug 205, Fig. 8, connects to the jack J6, Fig. 6—A, and it will be noted that the lamp 203 and resistor 204 are connected between the first and third terminals of the jack 205, thus connecting the lamp 203 in parallel with the lamp 157 on Fig. 6—A. The lamp 203 will thus indicate the starting and synchronizing of the motors in the same manner as the lamp 157, Fig. 6—A.

In Fig. 6—A, a circuit may be traced from the second terminal of the jack J6, wire 136, switch 150, wire 151, wire 174, to the fifth terminal of jack J6. Similarly in Fig. 8, a circuit may be traced from the second terminal of plug 205, switch 206 to the fifth terminal of plug 205. Thus the switch 206 in Fig. 8 is in parallel with the starting switch 150 in Fig. 6—A, and the operation of switch 206, Fig. 8, will start all of the motors associated in the system.

In Fig. 6—A, a circuit may be traced from the second terminal of the jack J6, wire 136, meter 166, switch 165, wire 167, to the fifth terminal of the jack J6. Similarly, in Fig. 8 a circuit may be traced from the second terminal of plug 205, through meter 207 and switch 208 to the fourth terminal of the plug 205, thus placing the combination of the meter 207 and switch 208 in parallel with the combination of the "blooping" meter 166 and switch 167. The operation of switch 208, Fig. 8, will thus "bloop" all of the cameras and recorders associated in the system.

The meter 208 is in series in the "bloop" circuit and acts as a pilot device to indicate whether the "bloop" circuit is normal. The meter 208 has no meter scale, but is equipped with a pointer, or other indicator, which may be manually adjusted. The "bloop" circuit is checked before use, and the pointer set at the correct value for the lamps in use, thereafter, when the circuit is "blooped," the meter hand should move to the pointer. If the meter does not read the correct value, it indicates that one camera has not been properly "blooped" so the "take" is stopped until the trouble is rectified.

When operating on location, away from commercial power supplies, or under any other condition, in which operation on batteries is considered to be desirable, the combined alternating current, direct current control cabinet shown in Fig. 5 may be simplified by the omission of the alternating current feature, to form a direct current control cabinet as shown in Figs. 9 and 9—A. The operation of the direct current control cabinet shown in Figs. 9 and 9—A is very similar to the operation of the combined control cabinet shown in Fig. 5 when the combined cabinet is operated on direct current. A tapped battery or other source of direct current is connected to the plug P6, Fig. 9—A, the positive terminal of the battery being connected to the upper terminal of the plug and the negative terminal of the battery to the lowest terminal of the plug. The switch 209 connects the desired tap of the battery to the positive bus-bar 210. The voltmeter 212 measures the voltage applied between the positive bus-bar 210 and the negative bus-bar 211. The disconnect switches, such as switches 213 and 214, associated with all of the motors which are to be operated in the system, are closed. The disconnect switches 215, 216 and 217 are also closed. As shown on Fig. 4, by operating the switch 17 the camera man completes a circuit from the second terminal of jack 25 through the film buckle switch 26 and switch 17 to the fourth terminal of jack 25. The jack 25 is associated with one of the plugs P1 to P4, Fig. 9. Thus, considering the plug P3, Fig. 9, a circuit is completed from the negative bus-bar 211 through the second terminal of plug P3 to the fourth terminal of plug P3, wire 218, left-hand break terminal of relay 219, wire 220, switch 216, wire 221, winding of start relay 222, wire 223, to the positive terminal of the battery, thus operating the start relay 222 and connecting the battery bus-bars 210 and 211, through the make contacts of relay 222, and resistors 224 and 225 to the camera motor, Fig. 4, thus starting the motor. When the motor comes up to speed, the generated electromotive force causes the operation of relay 226 thus short-circuiting the resistors 224 and 225. Similarly, the operation of the starting switch at the recorder motor completes a circuit between the second and fourth terminals of the plug P4, operating the relays 227 and 228 through the switch 217, the right-hand break contact of relay 219, wire 235, switch 215, wire 236, starting the recorder motor. In Fig. 4 it will be noted that the second and third terminals of the jack 25 are connected through the film buckle switch 26. By the operation of switch 230, Fig. 9—A, a circuit is completed from the positive bus-bar 210 through the upper make springs of switch 230, wire 231, windings of the switching relays 219, wire 232, lower make contact of switch 230, resistor 229, to the negative bus-bar 211, thus operating the switching relays 219. The operation of the switching relay 219 completes a circuit from negative bus-bar 211, through the second terminal of the plug P3, through the film buckle switch, Fig. 4, the third terminal of plug P3, wire 233, make contact of relay 219, wire 220, switch 216, wire 221 and winding of start relay 222, to the positive terminal of the battery, thus operating the start relay 222 and starting the motor of camera No. 3. A similar circuit may be traced from the negative bus-bar 211 through the second contacts of plug P4, to the third contacts of plug P4, wire 234, right-hand make contact of relay 219, wire 235, switch 215, wire 236, winding of relay 227 to the positive bus-bar, thus operating the start relay 227 and starting the motor associated with the sound recorder. The synchronizing tappings on the armature of the motor of camera No. 3 are connected through the ballast lamps 237, 238, 239 and the three lower springs of the disconnect switch 214 with the synchronizing bus-bars. The synchronizing tappings on the armature of the recorder motor are similarly connected through the jack J4, and the three lower springs of the disconnect switch 213 with the synchronizing bus-bars. Current is supplied to the shunt field of the motor of camera No. 3 through the field rheostat 240 and to the shunt field of the recorder motor through the field rheostat 241.

The operation of the start relay 222 completes a circuit from the positive bus-bar 210 through the lamp 242, resistor 243, wire 244, resistor 225, left make contact of the start relay 222, to the negative bus-bar 211, thus lighting the lamp 242, indicating that the motor of camera No. 3 is running at normal speed. An intermittent flashing of the lamp 242 will indicate when the motor of camera No. 3 is out of synchronism. Similar lamps and resistors, such as lamp 245 and resistor 246, are provided for the other motors associated with the cabinet.

The three-phase transformer 247 is energized by the synchronizing current flowing in the interlock bus-bars. The operation of switch 248, Fig. 9—A, completes a circuit from the right-hand winding of the transformer 247, through the switch 248, wire 249, resistor 250, primary winding of transformer 251, wire 252, lamp 253, disconnect switch 213, wire 254, back to the left-hand winding of the transformer 247, thus supplying alternating current of constant frequency and constant amplitude to the primary of the transformer 251. The secondary winding of the transformer 251 is connected through the two lower terminals of the plug P4, to the sound recorder, thus supplying current either to the sound recording device, or to some other device that will make a starting mark on the sound record. The operation of the switch 248 also completes a circuit from the right-hand winding of the transformer 247, switch 248, wire 249, wire 255, to the lowest terminal of the plug P3, Fig. 9, thence to the lower terminal of the jack 25, Fig. 4, through the lamp 126 and the buzzer 127 to the fifth terminal of the jack 25, thence to the fifth terminal of the plug P3, Fig. 9, wire 256 and lamp 257, disconnect switch 214, wire 254, to the left-hand winding of the transformer 247, thus lighting the lamp 126 in the camera to cause a short exposure of the film in the camera and also operating the buzzer 127 to notify the personnel on the set that the camera is ready for the take. The operation of the switch 248 also causes the lamp, such as lamp 253 and lamp 257, individual to each of the motors, to light, thus indicating that that camera or recorder has been successfully "blooped."

One phase of the interlock bus-bars individual to each motor and of the interlock bus-bars common to all the motors is wired to the switch 258. The meter 259 and network 260 associated with the switch 258 thus can measure the frequency of the interlock current from each of the motors and this frequency is an indicator of the speed of the motor.

As shown in Fig. 3, two or more of the direct current control cabinets, shown in Figs. 9 and 9—A, may be interconnected together or they may be interconnected with one or more of the alternating current, direct current control cabinets, shown in Fig. 5, when the latter cabinets are operated on direct current. To interconnect two cabinets, the jack J5, Fig. 9—A, is connected to the plug P5 of the second cabinet. The interlock bus-bars of the first cabinet which are connected to the three upper terminals of the jack J5, are thus connected to the three upper terminals of the plug P5 in the second cabinet, thence through wires 261, 262, 263 and the ballast lamps 264, 265, 266 to the common interlock bus-bars of the second cabinet. The operation of switch 267 in the first cabinet completes a circuit from the right-hand winding of transformer 247, switch 267, wire 268, to the lowest terminal of the jack J5, thence to the lowest terminal of the plug P5, in the second cabinet, wire 269, upper break contact of switch 230, wire 231, winding of switching relays, such as relay 219, Fig. 9, wire 232, lower break springs of switch 230, wire 254 to the left-hand winding of the transformer 247 in the second cabinet. As all of the transformers, such as transformer 247, in the various cabinets are supplied with power from the common interlock bus-bars between the two cabinets, the closing of switch 267 in the first cabinet will operate the switching relays in the second cabinet and start all the motors associated with the second cabinet. Also, if the switch 230 in the first cabinet is unoperated, the closing of the switch 267 in the first cabinet will also operate the switching relays such as relay 219, Fig. 9, and start all the motors associated with the first cabinet. Thus the operation of the switch 267 in any of the cabinets associated together to form the system will start all of the motors associated in the system.

As described hereinabove, the operation of switch 248 will "bloop" all the cameras and recorders associated with the control cabinet. The operation of the switch 248 in one of the cabinets will also complete a circuit from the right-hand winding of the transformer 247 in that cabinet through switch 248, wire 249, wire 255, to the fifth terminal of the jack J5, thence to the fifth terminal of the plug P5 in the second cabinet and in that cabinet over wire 255 and the corresponding camera plug to the "blooping" lamp and buzzer in the camera, wire 256, Fig. 9, lamp 257, disconnect switch 214, wire 254, to the left-hand winding of the transformer 247 in the second cabinet, thus "blooping" all of the cameras associated with the second cabinet simultaneously with the "blooping" of the cameras associated with the first cabinet. The operation of the switch 248 in the first cabinet also closes a circuit from the right-hand winding of transformer 247, switch 248, wire 249, wire 255, fifth terminal of jack J5, thence to the fifth terminal of the plug P5 in the second cabinet and in that cabinet wire 255, resistor 250, primary winding of transformer 251, wire 252, lamp 253, disconnect switch 213, wire 254, to the left-hand winding of the transformer 247 in the second cabinet, thus "blooping" the sound recorder associated with the second cabinet.

In some cases when on location a camera may be located so far away from the control cabinet that the resistance of the supply lead from the cabinet to the motor becomes high enough to cause unstable operation of the motor.

With a sound recorder located near the control cabinet, a camera equipped with the preferred form of motor will work satisfactorily with a resistance of about eight ohms per leg, that is, about two thousand feet of number sixteen Brown and Sharpe copper wire. Two cameras will work satisfactorily with four ohms per leg, and three cameras with about three ohms per leg, in other words, the total resistance may be about eight ohms, divided as desired among the motors. In some cases, the locations of the cameras are such that the total resistance exceeds these preferred limits.

In such cases an extension box, as shown in Fig. 10, may be inserted between the camera and the control box in the vicinity of the camera. In such cases, the plug P3, Fig. 9, is connected to the jack 271, Fig. 10, thence directly to the plug 272, Fig. 10, and from there to the jack 25, Fig. 4, on the camera. As the control devices associated with jack 25, Fig. 4, all operate on moderately small current, the resistance of the signal wires between the camera and the control cabinet does not prevent satisfactory operation of the control and signaling devices.

The jack J3, Fig. 9, is connected to the plug 273, Fig. 10, and the jack 274, Fig. 10, is connected to the plug 30, Fig. 4. When the start relay 222, Fig. 9, corresponding to this camera, is operated, current is supplied from the battery bus-bars in the control cabinet through the contacts of relay 222 to the two lowest terminals of jack J3, thence to the two lowest terminals of plug 273 through the upper contacts of switch 275 to the winding of relay 276, thus operating relay 276. The two left-hand springs of the relay 276 connect the interlock bus-bars in the control cabinet through the three upper terminals of plug 273 to the three upper terminals of jack 274, thence to the three upper terminals of plug 30, Fig. 4, to the tappings on the armature winding of the camera motor. The two right-hand springs of the relay 276 connect a local source of current, such as the battery 277, to the two lowest terminals of the jack 274, thence to the two lowest terminals of plug 30, Fig. 4, to the armature and field winding of the camera motor, thus starting the camera motor. The shunt field resistor 278, Fig. 10, is connected into the circuit in the usual manner. By moving the switch 275 to the lower contacts, the camera man may operate the relay 276 to start the motor when "slating" his camera.

What is claimed is:

1. In combination, a plurality of motors, switches individual to each motor located adjacent to the motor, a source of power, a control cabinet for supplying power from said source to all of said motors, a plurality of two-position switches in said cabinet, connections from the switch associated with a motor through the normal position of the two-position switch associated with said motor, whereby the motor may be individually started by the operation of said switch, and other connections from the off-normal contact of said two-position switches to the associated motors whereby the operation of all of the two-position switches in the cabinet from the normal to the off-normal contacts will simultaneously start all of the motors associated with said cabinet.

2. In combination, a plurality of motors, a plurality of control cabinets, each cabinet supplying power to a different group of said motors, switches adjacent to each motor for individually starting that motor with power from the associated control cabinet, a switch individual to each motor in the associated control cabinet, and means for simultaneously operating all of the switches in all of the control cabinets from any one of the control cabinets for simultaneously starting all of the motors associated in the system.

3. In a motor control system, a plurality of motors, a source of power for operating said motors, means individual to each motor for supplying power from said source to the motor, and a circuit for controlling said supply means comprising a switch individual to each motor adjacent to the motor, and a double-throw switch adapted in the normal position to complete a circuit for controlling said supply means through the switch located at the motor and in the operated position to complete a circuit for the operation of said supply means not passing through the switch at said motor.

4. In a motor control system, a plurality of motors, a source of power for operating said motors, means individual to each motor for controlling the supply of power from said source to the motor, and a circuit for controlling said supply means comprising a source of power, a switch individual to each motor adjacent to the motor and a plurality of double-throw switches adapted in the normal position to complete a circuit from said source of power through said supply means and switch located at the motor and in the operated position to complete a circuit from said source of power through said control means and the operated positions of said switches individually bridging said starting switches and simultaneously starting a plurality of said motors.

5. In a motor control system, a motor, a source of power for operating said motor, a starting relay for controlling the supply of power from said source to said motor, and a circuit for operating said relay comprising a source of power, the winding of said relay, a double-throw switch and a switch individual to said motor all in series, and connections whereby said double-throw switch when operated bridges the switch located at the motor.

6. In a motor control system, a motor, a source of power for operating said motor, a starting relay for controlling the supply of power from said source to said motor, and a circuit for controlling the operation of said starting relay including a switching relay having a winding and having a two-position spring combination for said motor and a switch individual to said motor, means for connecting said starting relay, the springs of said switching relay when in the non-operated condition, and said individual switch in serial relationship, and means for connecting said starting relay and the springs of said switching relay when in the operated position in serial relationship, a second source of power, and means for controlling said switching relay by supplying power from said second source to said winding.

7. In a motor control system, a plurality of motors, a source of power starting relays individual to each motor for controlling the supply of power from said source to the motor, and circuit connections for controlling the operation of said starting relays comprising said source of power, a switching relay, and a switch individual to each motor, whereby in the non-operated position of said switching relay, said source of power, the starting relay individual to a motor, the springs of the switching relay and the switch individual to that motor are in serial relationship, and in the operated position of said switching relay, all of said starting relays are simultaneously connected in serial relationship with said source of power through the operated springs of said switching relay, and means for operating said switching relay.

8. In a motor control system, a plurality of motors, divided into groups, a control cabinet for each group of motors, a current supply in each cabinet for operating the group of motors associated with that cabinet, starting relays in each cabinet individual to each motor of the group, switching relays in each cabinet having contacts individual to each motor adapted to energize the starting relay of that motor, transformers in said cabinets energized from a common source of power, connections from one winding of the transformer in a cabinet to the windings of all the switching relays in that cabinet, a switch in each cabinet, a connection from another winding of said transformer through said switch to the winding of said switching relay, and a connection from the switch in one cabinet to the switch in the other cabinet, whereby the operation of the switch in any cabinet will operate all the switching relays in all the cabinets associated in the system.

9. In a motor control system, a plurality of direct current motors having their armature windings tapped at a plurality of electrically equidistant points, bus-bars interconnecting said armature tappings to electrically interlock the motors, a starting relay individual to each motor, a plurality of switching relays having contacts individual to each motor adapted to connect the starting relay of said motor to a source of power, a transformer energized from the interlock bus-bars of said motors, and switching means for connecting the windings of said transformer to the windings of said switching relays whereby the starting relays of said motors are simultaneously operated.

10. In a motor control system, a plurality of direct current motors forming a plurality of groups of motors, a control cabinet for each group, bus-bars in each cabinet for interconnecting a plurality of electrically equidistant tappings on the armature windings of each motor, means for interconnecting the bus-bars in the various cabinets, a starting relay in the cabinet individual to each motor of the group, switching relays in each cabinet having contacts individual to each motor adapted to connect the starting relay of that motor to a source of power, a transformer in each cabinet energized from the bus-bars of that cabinet, a connection from one winding of the transformer in a cabinet to the windings of all the switching relays in said cabinet, switching means in each cabinet for connecting another winding of the transformer in said cabinet to the windings of the switching relays in said cabinet, and means interconnecting the switching means in all the cabinets, whereby the operation of the switching means in any cabinet will operate all the switching relays in all of the cabinets.

11. In a motor system, a plurality of motors each having armature windings, a commutator and direct current field windings, the armature windings of said motors being tapped at three electrically equidistant points, a three-phase alternating current supply for the armatures of all said motors, a relay individual to each motor, the winding of said relay and the field of said motor being connected across the commutator of said motor, a break-before-make combination of springs for each relay, the armatures of all said relays and the break springs of all said relays being respectively connected together, a lamp common to all said motors connected to the break springs of said relays, a lamp individual to each motor connected to the make spring of the corresponding relay whereby the operation of any relay on the current generated in the armature will connect the corresponding individual lamp to a source of power and the operation of all of the relays will cause the extinguishment of the common lamp.

12. In a motor indicating system, a plurality of motors divided into groups, each motor having direct current field windings, armature, and armature windings, said armature windings being tapped at three electrically equidistant points, a control cabinet for each group of motors, a three-phase alternating current power supply connected to the tappings of the armatures of all of said motors, a relay individual to each motor, the field winding of said motor and the winding of said relay being connected across the commutator of said motor, a break-before-make spring combination for each relay, the armatures and break springs of all the relays in a cabinet being respectively connected in multiple relation, a transformer in each cabinet excited from the common power supply, a connection from one winding of the transformer to the armatures of all of the relays in a cabinet, a lamp individual to each motor, a second lamp common to all the motors, a connection from the other winding of the transformer through said individual lamp to the make springs of the corresponding relay, and from this winding through said common lamp associated in the cabinet to the break springs of said relay and a connection from the break spring of the relay in one cabinet to the break spring of the relay in the other cabinet, whereby the individual lamps will light as each motor comes up to speed, and the common lamp in both cabinets will remain lighted until all of the motors associated with all of the cabinets have come up to speed and will be relighted if any motor associated with the cabinet becomes out of synchronism with the other motors.

13. In a motion picture system, a plurality of cameras divided into groups cooperatively photographing a motion picture production, a control cabinet for each group of cameras, a transformer in each cabinet, said transformers being excited from the same source of alternating current of constant frequency and amplitude, a lamp so disposed in each camera as to produce an exposure of the motion picture film, an electrical connector associated with each cabinet, a connection from one winding of the transformer in a cabinet to all of the lamps in the cameras associated with that cabinet and to said connector, switching means in said cabinet, a connection from another winding of said transformer through said switching means to all of the lamps in the cameras associated with that cabinet and to the connector associated with that cabinet, and means for interconnecting the connector associated with one cabinet with the connectors associated with the other cabinets, whereby the operation of the switching means in any cabinet will light all of the lamps in all of the cameras associated with all of said cabinets.

14. In a film sound motion picture system, a plurality of motion picture cameras and film sound recorders divided into groups cooperatively recording a motion picture production, a control cabinet for each of said groups, a transformer in each of said cabinets, said transformers being excited from the same source of alternating current of constant frequency and amplitude, lamps in said cameras so disposed as to produce an exposure of the motion picture film, an electrical connector associated with each cabinet, a connection from one winding of the transformer to all of the lamps and the connector associated with a cabinet and to the sound recording channel associated with said cabinet, switching means in each cabinet, a connection from another winding of said transformer through the switching means to all of said lamps, the connector and the sound recorder associated with the cabinet, and means to interconnect the connector associated with one cabinet with the connectors associated with the other cabinets whereby the operation of the switching means in any cabinet will light all of the lamps in the cameras associated with all of the cabinets and will supply alternating current of constant frequency and amplitude to all of the film sound recording channels associated with all of the cabinets.

15. In a sound motion picture system, a plurality of motors individually operating motion picture cameras, a cabinet for controlling said camera motors, a plurality of motors for individually driving sound recorders, a recorder control cabinet for controlling said motors driving sound recorders, switching means adjacent to each motor for individually starting that motor, means for interconnecting said recorder control cabinet and said camera control cabinet, means in said camera control cabinet for simultaneously starting all of said motors operating cameras and driving sound recorders, means in said recorder control cabinet for simultaneously starting all of said motors operating cameras and driving sound recorders, pilot lamps in said camera control cabinet and said recorder control cabinet for indicating when all of said motors have come up to speed, and for indicating when any motor drops out of synchronism with the other motors, lamps in said cameras so disposed as to produce an exposure of the motion picture film, and means in said camera control cabinet and other means in said recorder control cabinet for simultaneously lighting all of the lamps in said cameras and applying an alternating current of constant frequency and amplitude to the sound recorders driven by said motors.

16. In a motion picture system, a plurality of motors individually operating motion picture cameras, a cabinet for controlling the operation of said motors, and an extension cabinet associated with said control cabinet, means in said extension cabinet for simultaneously starting all of the motors associated with said control cabinet, a pilot lamp in said extension cabinet which is extinguished when all of said motors come up to speed, lamps in said cameras so disposed as to produce an exposure of said motion picture film, switching means in said extension cabinet for simultaneously lighting all of said lamps and a meter in said extension cabinet in serial relationship with said lamps to indicate the successful lighting of said lamps.

17. In a motion picture system, a plurality of motors individually operating motion picture cameras, said motors having direct current armatures and fields, the armature winding being tapped at three electrically equidistant points, a control cabinet for supplying current to said motors and for interconnecting the tappings on said armature windings, one of said motors being located so far from said control cabinet that the resistance of the direct current supply lead tends to cause unsteady operation of said motor, an auxiliary cabinet between said motor and said control cabinet and near said motor, said auxilary cabinet controlling a local source of current, and means in said auxiliary cabinet controlled from said control cabinet for connecting said local source of power to said motor and for interconnecting the tappings on the armatures of said motor with the tappings on the armatures of the other motors.

18. In a combined motion picture and sound recording system, a plurality of motors for driving motion picture cameras, an indicator bearing indicia relating to the scene being photographed, means for individually starting and stopping the motors of said cameras to photograph said indicator, a plurality of motors for driving sound recorders, a control cabinet for all said motors, means in said cabinet for simultaneously starting all of said motors, means in said cabinet for indicating when each of said motors has attained normal speed, means in said cabinet for indicating when all of said motors have attained normal speed, means in said cabinet for indicating when all of said motors are running at normal speed in synchronism, means in each camera and sound recorder for marking a starting point on the record and means in said cabinet for simultaneously operating all of said marking means after all of said motors are running in synchronism at normal speed.

19. In a combined motion picture and sound recording system, a plurality of motors for driving motion picture cameras and sound recorders, said cameras and sound recorders being divided into groups, an indicator carrying information relating to the production being photographed by said camera, means for individually starting and stopping the motors of said cameras to photograph said indicator, a plurality of control cabinets, one control cabinet being associated with each group of said motors, means in each cabinet for simultaneously starting all the motors associated with that cabinet, means in each cabinet for simultaneously starting all of the motors associated with all of the cabinets, means in each cabinet for individually indicating when each motor associated with the cabinet has attained normal speed, means in each cabinet for indicating when all of the motors associated with that cabinet have attained normal speed, means in each cabinet for indicating when all of the motors associated in the system have attained normal speed, means in each cabinet for indicating when any motor in the system is out of synchronism with the other motors, means in each camera and sound recorder for marking a starting point on the record, and means in each cabinet for simultaneously operating the marking means in the cameras and sound recorders associated with all of the cabinets.

ARTHUR L. HOLCOMB.